US010122251B2

(12) United States Patent
Keats et al.

(10) Patent No.: US 10,122,251 B2
(45) Date of Patent: Nov. 6, 2018

(54) SEQUENTIAL ACTUATOR WITH SCULPTED ACTIVE TORQUE

(71) Applicant: COM DEV Ltd., Mississauga (CA)

(72) Inventors: Brian Keats, Milton (CA); Klaus Engel, Waterloo (CA)

(73) Assignee: COM DEV LTD., Mississauga (CA)

( * ) Notice: Subject to any disclaimer, the term of this patent is extended or adjusted under 35 U.S.C. 154(b) by 250 days.

(21) Appl. No.: 14/725,686

(22) Filed: May 29, 2015

(65) Prior Publication Data

US 2016/0352206 A1 Dec. 1, 2016

(51) Int. Cl.
| | | |
|---|---|---|
| *H02K 37/10* | (2006.01) | |
| *H01P 1/12* | (2006.01) | |
| *H02K 37/02* | (2006.01) | |
| *H02K 1/14* | (2006.01) | |
| *H02K 19/06* | (2006.01) | |

(52) U.S. Cl.
CPC ............ *H02K 37/10* (2013.01); *H01P 1/122* (2013.01); *H02K 1/146* (2013.01); *H02K 37/02* (2013.01); *H02K 19/06* (2013.01)

(58) Field of Classification Search
CPC ........ H02K 37/10; H02K 1/146; H02K 19/06; H01P 1/122
USPC .......................................... 310/49.43, 49.24
See application file for complete search history.

(56) References Cited

U.S. PATENT DOCUMENTS

| | | | | |
|---|---|---|---|---|
| 464,294 | A | * 12/1891 | Lundin | ..................... G06C 7/10 101/96 |
| 538,161 | A | * 4/1895 | Sakamoto | .............. B61D 23/02 105/437 |
| 2,945,193 | A | 7/1960 | Strom | |

(Continued)

FOREIGN PATENT DOCUMENTS

| | | |
|---|---|---|
| DE | 3441728 A1 | 7/1985 |
| DE | 3702417 A1 | 8/1988 |

(Continued)

OTHER PUBLICATIONS

Extended European Search Report dated Nov. 9, 2016 in corresponding EP Patent Application No. 16169797.4.

*Primary Examiner* — Forrest M Phillips
(74) *Attorney, Agent, or Firm* — Bereskin & Parr LLP/S.E.N.C.R.L., s.r.l.; Isis E. Caulder; T. Cameron Gale

(57) ABSTRACT

A sequential actuator for a radio frequency switch includes a rotor designed to be rotated in a designated rotational direction of the actuator and a stator defining with the rotor when the stator is energized an active torque curve of the rotor having asymmetric positive and negative torque curve portions. Magnetic elements are distributed between the rotor and the stator and define a detent torque curve of the rotor. In some examples, when the stator is energized, the rotor undergoes a first rotation from a position of partial angular overlap of a first rotor magnetic element with a first stator electromagnet to a position of angular alignment of the first rotor magnetic element with the first stator electromagnet. Upon reaching this angular position, a second rotor (Continued)

magnetic element has a partial angular overlap with a second stator electromagnet and the rotor further undergoes a second rotation to another position of angular alignment of the second rotor magnetic element with the second stator electromagnet.

20 Claims, 15 Drawing Sheets

(56) References Cited

U.S. PATENT DOCUMENTS

| | | | |
|---|---|---|---|
| 3,350,585 A | 10/1967 | Maynard | |
| 4,500,861 A * | 2/1985 | Nelson | H01F 7/145 335/253 |
| 4,633,201 A | 12/1986 | Ruff | |
| 4,647,889 A * | 3/1987 | Addis | B60K 37/06 335/253 |
| 4,717,898 A | 1/1988 | Cappelli | |
| 4,795,929 A | 1/1989 | Elgass et al. | |
| 4,851,801 A | 7/1989 | Engel | |
| 5,039,968 A | 8/1991 | Ruff et al. | |
| 5,065,125 A | 11/1991 | Thomson et al. | |
| 5,281,936 A | 1/1994 | Ciezarek | |
| 5,345,131 A | 9/1994 | Torok | |
| 5,499,006 A | 3/1996 | Engel et al. | |
| 5,652,558 A | 7/1997 | Leikus et al. | |
| 5,747,898 A * | 5/1998 | Yoshimura | H02K 37/18 310/49.24 |
| 5,748,055 A | 5/1998 | Ors | |
| 5,796,226 A | 8/1998 | Ookawa et al. | |
| 6,037,849 A | 3/2000 | Ciezarek | |
| 6,650,210 B1 | 11/2003 | Raklyar et al. | |
| 6,856,212 B2 | 2/2005 | Kwiatkowski et al. | |
| 6,870,454 B1 | 3/2005 | Vladimirescu et al. | |
| 7,015,615 B2 | 3/2006 | Ramu | |
| 7,135,947 B2 | 11/2006 | Engel | |
| 7,208,906 B2 | 4/2007 | Turner et al. | |
| 7,375,488 B2 | 5/2008 | Jones | |
| 7,633,361 B2 | 12/2009 | Raklyar et al. | |
| 7,843,289 B1 | 11/2010 | Raklyar et al. | |
| 7,924,124 B2 | 4/2011 | Leipold et al. | |
| 8,319,456 B2 | 11/2012 | Ramu | |
| 8,736,136 B2 | 5/2014 | Lee et al. | |
| 2002/0185990 A1 | 12/2002 | Elliott et al. | |
| 2005/0168309 A1 | 8/2005 | Engel | |
| 2005/0200222 A1* | 9/2005 | Yashiro | H02K 1/276 310/156.45 |
| 2012/0001501 A1 | 1/2012 | Calley | |
| 2013/0134825 A1 | 5/2013 | Gayler | |
| 2013/0270928 A1 | 10/2013 | Nord | |
| 2014/0117791 A1 | 5/2014 | Fiseni | |
| 2014/0239862 A1 | 8/2014 | Randall et al. | |

FOREIGN PATENT DOCUMENTS

| | | |
|---|---|---|
| DE | 3706515 A1 | 9/1988 |
| GB | 447552 A | 5/1936 |
| WO | 2005/101621 A2 | 10/2005 |

* cited by examiner

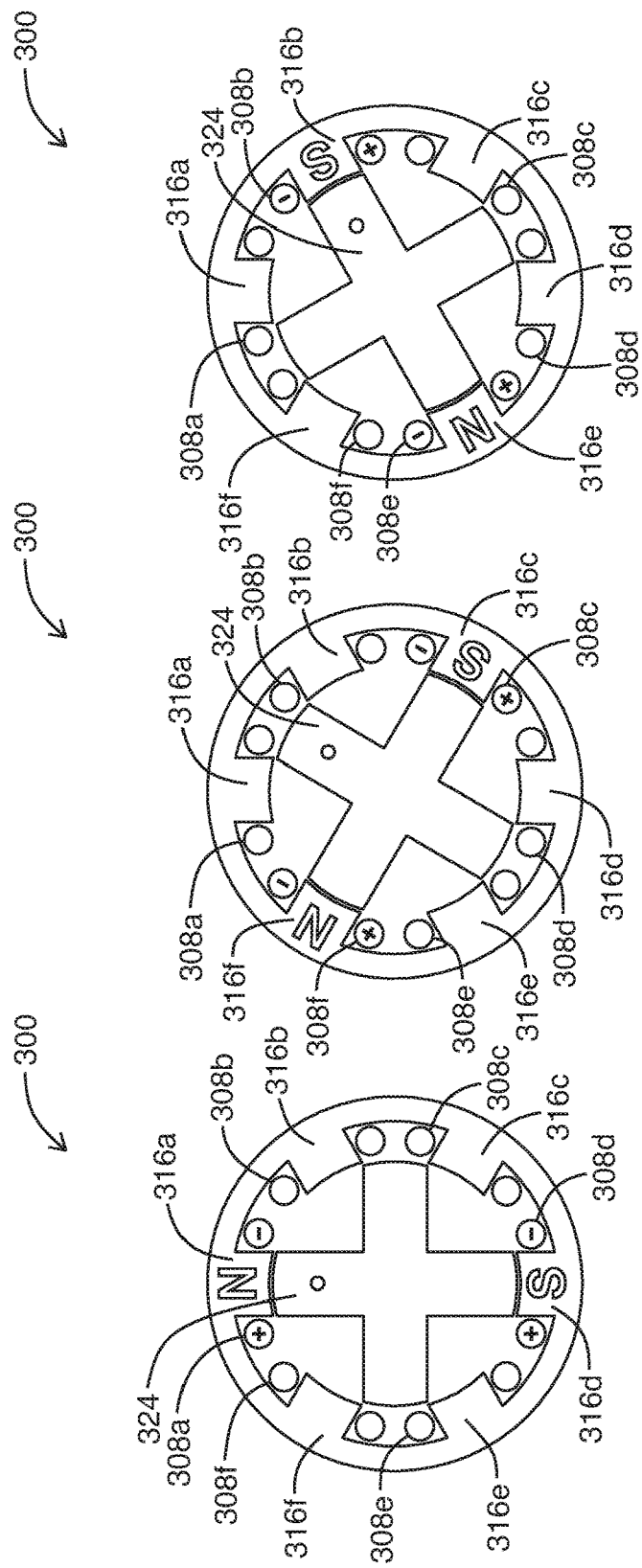

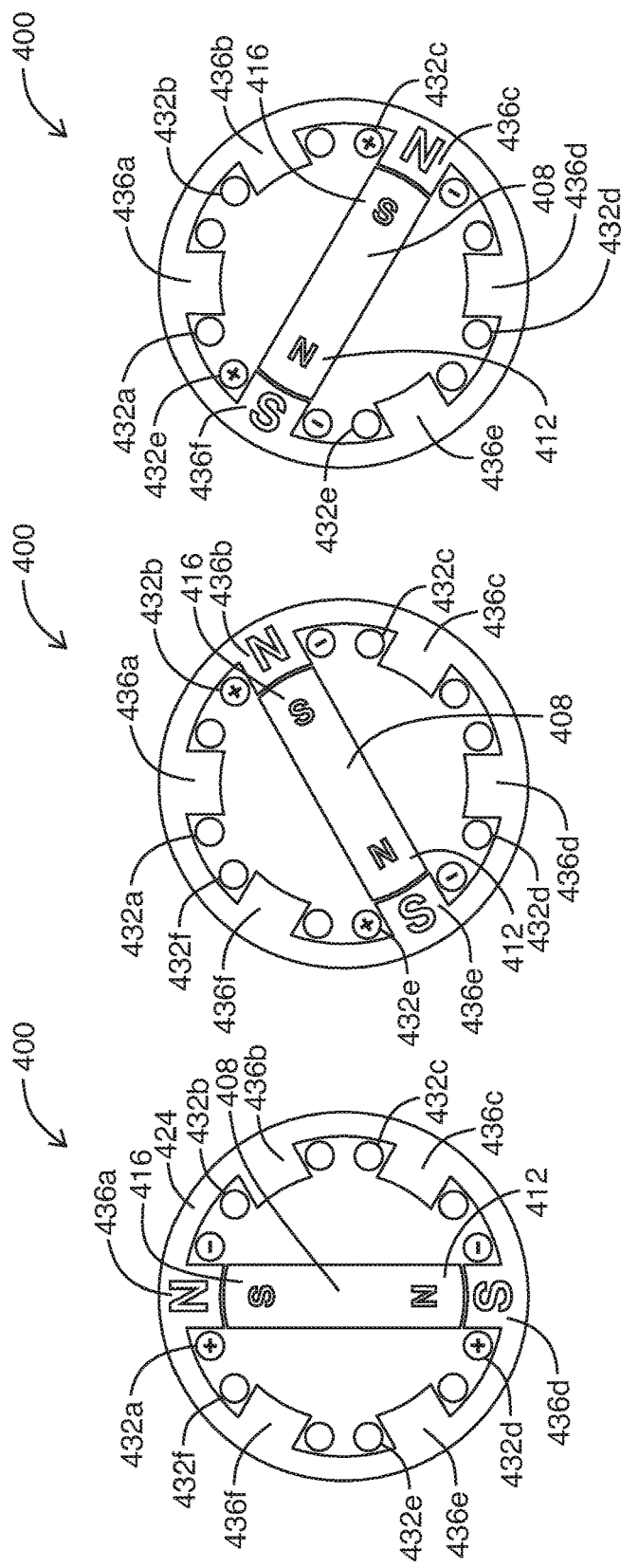

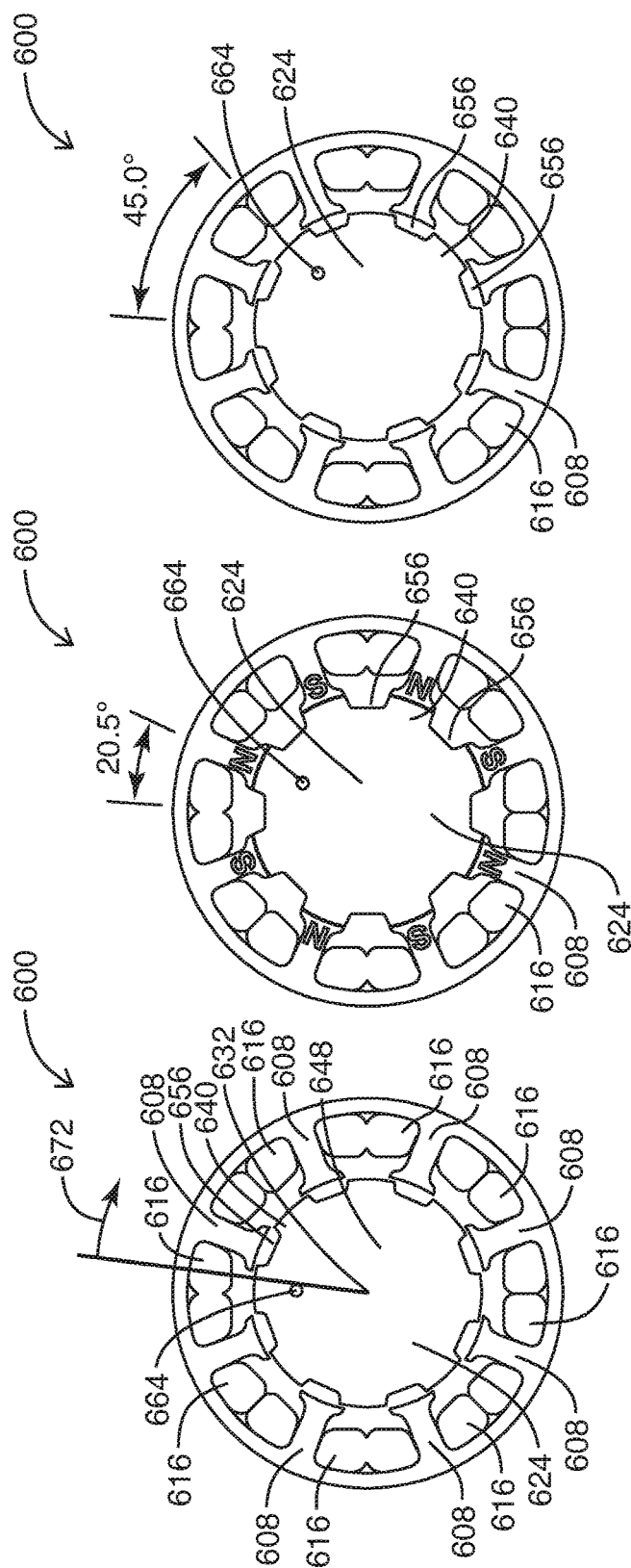

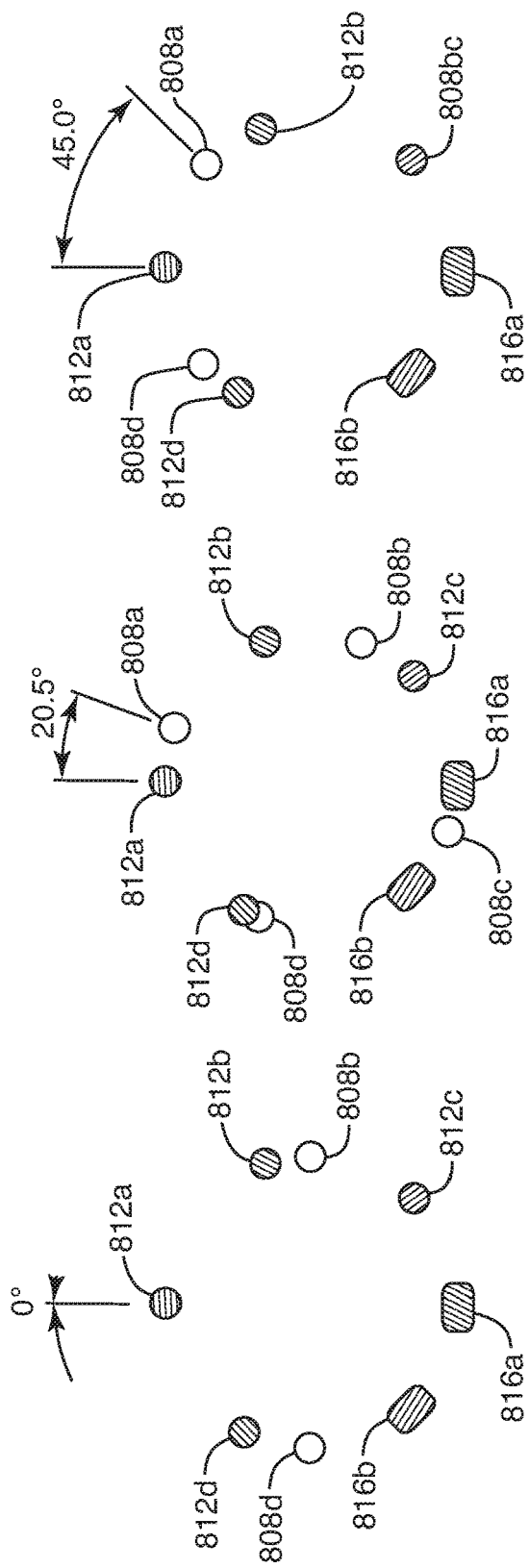

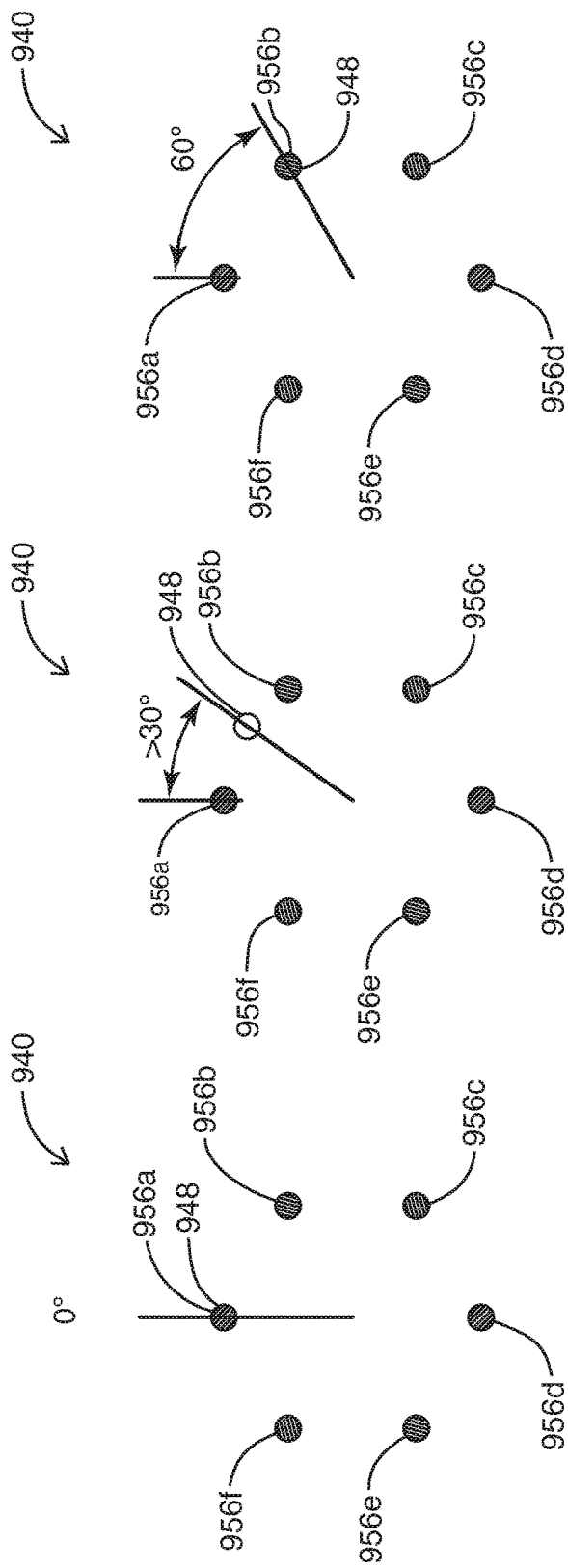

SEQUENTIAL ACTUATOR WITH SCULPTED ACTIVE TORQUE

FIELD

The present subject-matter relates to sequential actuators for radio frequency switches, and more particularly to sequential actuators having a sculpted active torque.

INTRODUCTION

Radio frequency switches are used to selectively join different branches within one or more radio frequency circuits. A typical switch has one or more actuators that can be selectively moved to a plurality of positions. In each position, the actuator cause engagement and disengagement of actuated elements capable of conducting radio frequency signals, thereby selective joining different branches of the one or more radio frequency circuits.

A rotary radio frequency switch has a rotor that rotates about an axis. The rotary switch may have a random actuator configuration or a sequential actuator configuration. In the random actuator configuration, a pole is associated with each defined angular position of the rotor. When a given pole is energized, the rotor is rotated to the angular position associated to that pole. Any one of the defined angular positions can be reached from any other defined angular position.

In a sequential actuator configuration, the rotor is designed to be rotated in only one direction. From a given angular position, the rotor can be rotated in the designed direction of rotation to the subsequent angular position defined by one of the poles.

U.S. Pat. No. 5,499,006 discloses a radio frequency switch operates by permanent magnets located in a rotatable actuator. The permanent magnets of the actuator are arranged in groups so that there is at least one magnet in each group that has an opposite polarity to another magnet in the same group. The permanent magnets within the same group are located adjacent to one another. Conductors within an RF cavity have permanent magnets mounted thereon where all of the magnets have the same polarity. The switch can be moved from a first position to a second position by moving the actuator a distance not exceeding 40° and, preferably from 10° to 30°.

In the first position, one permanent magnet of one group interacts with the magnet on the conductor to move the conductor. In the second position, another magnet of the same group interacts with the magnet of the conductor to move the conductor. Since the actuator is moved a relatively short distance, the actuator can be moved by a relatively small step motor or the step motor can be replaced by electromagnets in some embodiments. The number of groups of magnets and the number of magnets in each group will vary depending on the type of switch. C-switches, single-pole double-throw switches and T-switches are described. Previous switches have actuators that move much more than 40° between positions, therefore requiring a larger, heavier and more expensive step motor or other mover.

U.S. Pat. No. 7,135,947 discloses A hybrid switch actuator having six positions that are stable in the absence of current and in which displacement occurs between an initial position and a target position under the action of a current. The actuator includes a stator and a rotationally moveable rotor package. The stator has six pole shoes. Each pair of opposed pole shoes is equipped with a common exciting coil. The rotor package has two pairs of rotor poles magnetized transversely in alternate directions and a permanent magnet ring and two end caps adapted to be engaged around said permanent magnet ring. Each end cap is associated with two rotor poles having maximum radius regions that correspond to the area of each of the stator pole shoes and reduced radius regions positioned adjacent the maximum radius regions such that each rotor pole can be precisely aligned with each stator pole shoe.

SUMMARY

It would thus be highly desirable to be provided with a system or method that would at least partially address the disadvantages of the existing technologies.

The embodiments described herein provide in one aspect a sequential actuator for a radio frequency switch. The actuator includes a rotor designed to be rotated in a designated rotational direction of the actuator, a stator defining with the rotor when the stator is energized an active torque curve of the rotor having asymmetric positive and negative torque curve portions, and a plurality of magnetic elements distributed between the rotor and the stator, each of the rotor and the stator having at least one of the magnetic elements, the distributed magnetic elements defining a detent torque curve of the rotor.

The embodiments described herein provide in another aspect a sequential actuator for a radio frequency switch. The actuator includes a rotor designed to be rotated in a designated rotational direction and having a plurality of angular arranged magnetic elements arranged, a stator having a plurality of angularly arranged electromagnets and wherein when the stator is energized, the rotor undergoes a first rotation in the designated rotational direction from an angular position of partial angular overlap of a first rotor magnetic element with a first stator electromagnet to a first angular position of angular alignment of the first rotor magnetic element with the first stator electromagnet along a first region of magnetic flux, and wherein upon reaching the first angular position, a second rotor magnetic element has a partial angular overlap with a second stator electromagnet and the rotor further undergoes a second rotation in the designated rotational direction to a second angular position of angular alignment of the second rotor magnetic element with the second stator electromagnet along a second region of magnetic flux.

In some examples, the active torque curve comprises a plurality of active stable zeros and a plurality of active unstable zero and a positive portion of the active torque curve within an angular range defined between two adjacently positioned active unstable zeros is angularly wider than a negative portion of the active torque curve within the angular range.

In some examples, the stator when energized has n poles and wherein at least one of the positive portions of the active torque curve has an angular width greater than $$\frac{360°}{2n}.$$

In some examples, each of the positive portions of the active torque curve has an angular width greater than $$\frac{360°}{2n}.$$

In some examples, each of the negative portions of the detent torque curve has an angular width substantially equal to $$\frac{360°}{2n}.$$

In some examples, the active torque curve is non-sinusoidal.

In some examples, the detent torque curve is sinusoidal.

In some examples, the detent torque curve is non-sinusoidal.

In some examples, a given positive portion of the active torque curve covers a given angular range defined between a given active unstable zero and an adjacent active stable zero in the designated rotational direction and a given negative portion of the detent torque curve corresponding to the given positive portion of the active torque curve is defined between a detent stable zero and an adjacent detent unstable zero in the designated rotational direction, the active unstable zero is at an angular position having a lesser value than an angular position of the detent stable zero along the designated rotational direction, thereby forming a lead angle, the active stable zero is at an angular position having a greater value than an angular position of the detent unstable zero, thereby forming an overlap angle, energizing the stator when the rotor is at the angular position of the detent stable zero rotates the rotor to an angular position of the active stable zero, and de-energizing the stator when the rotor is at the angular position of the active stable zero further rotates the rotor to an angular position of the detent stable zero.

In some examples, the rotor has a plurality of magnetic elements arranged circumferentially at a given diameter from an axis of the actuator, the stator has a plurality of electromagnets arranged circumferentially at the given diameter from the axis of the actuator, when the stator is energized, the rotor undergoes a first rotation in the designated rotational direction from an angular position of partial angular overlap of a first rotor magnetic element with a first stator electromagnet to a first angular position of angular alignment of the first rotor magnetic element with the first stator electromagnet along a first region of magnetic flux and upon reaching the first angular position, a second rotor magnetic element has a partial angular overlap with a second stator electromagnet and the rotor further undergoes a second rotation in the designated rotational direction to a second angular position of angular alignment of the second rotor magnetic element with the second stator electromagnet along a second region of magnetic flux.

In some example, the rotor has a plurality of magnetic elements arranged circumferentially at a given diameter from an axis of the actuator, the stator has a plurality of electromagnets arranged circumferentially at the given diameter from the axis of the actuator, when the stator is energized, the rotor undergoes a first rotation in the designated rotational direction from an angular position of partial angular overlap of a first rotor magnetic element with a first stator electromagnet to a first angular position of angular alignment of the first rotor magnetic element with the first stator electromagnet along a first region of magnetic flux and upon reaching the first angular position, a second rotor magnetic element has a partial angular overlap with a second stator electromagnet and the rotor further undergoes a second rotation in the designated rotational direction to a second angular position of angular alignment of the second rotor magnetic element with the second stator electromagnet along a second region of magnetic flux and the angular position of partial angular overlap of the first rotor magnetic element corresponds to the angular position of the detent stable zero.

In some examples, the magnetic elements of the rotor are chosen from permanent magnets and ferromagnetic protruding members extending from a base of the rotor in the direction of stator poles of the stator.

In some examples, the angular positions of the plurality of magnetic elements of the rotor and the angular positions of the plurality of electromagnets of the stator are determined based on numerical optimization.

In some examples, the rotor defines with the stator when energized an active torque curve of the rotor and the cumulative angular range of the first rotation and the second rotation corresponds to a portion of one continuous positive portion of the active torque curve of the rotor.

In some examples, in the second position, a third rotor magnetic element has a partial angular overlap with a third stator electromagnet and the rotor further undergoes a third rotation in the designated rotational direction to a third position of angular alignment of the second rotor magnetic element with the third stator electromagnet along a third region of magnetic flux.

In some examples, the magnetic elements have varying depth.

In some examples, the magnetic elements produce magnetic fields of varying magnetic strength.

DRAWINGS

For a better understanding of the embodiments described herein and to show more clearly how they may be carried into effect, reference will now be made, by way of example only, to the accompanying drawings which show at least one exemplary embodiment, and in which:

FIGS. 7 to 9 illustrate plan views of an exemplary variable-reluctance stepper motor known in the art with the rotor in various angular positions;

FIGS. 10 to 12 illustrate plan views of an exemplary permanent magnet stepper motor known in the art with the rotor in various angular positions;

FIGS. 16 to 18 illustrate plan views of an exemplary pure-reluctance sequential actuator with the rotor in various angular positions;

FIGS. 20 to 22 illustrates a schematic diagram of an exemplary distribution of magnetic elements between a rotor and stator with the rotor in various angular positions;

FIGS. 24 to 26 illustrate schematic diagrams of the distribution of magnetic elements between a rotor and a stator of the exemplary sequential actuator having the sculpted active torque curve;

DESCRIPTION OF VARIOUS EMBODIMENTS

Figure 1:
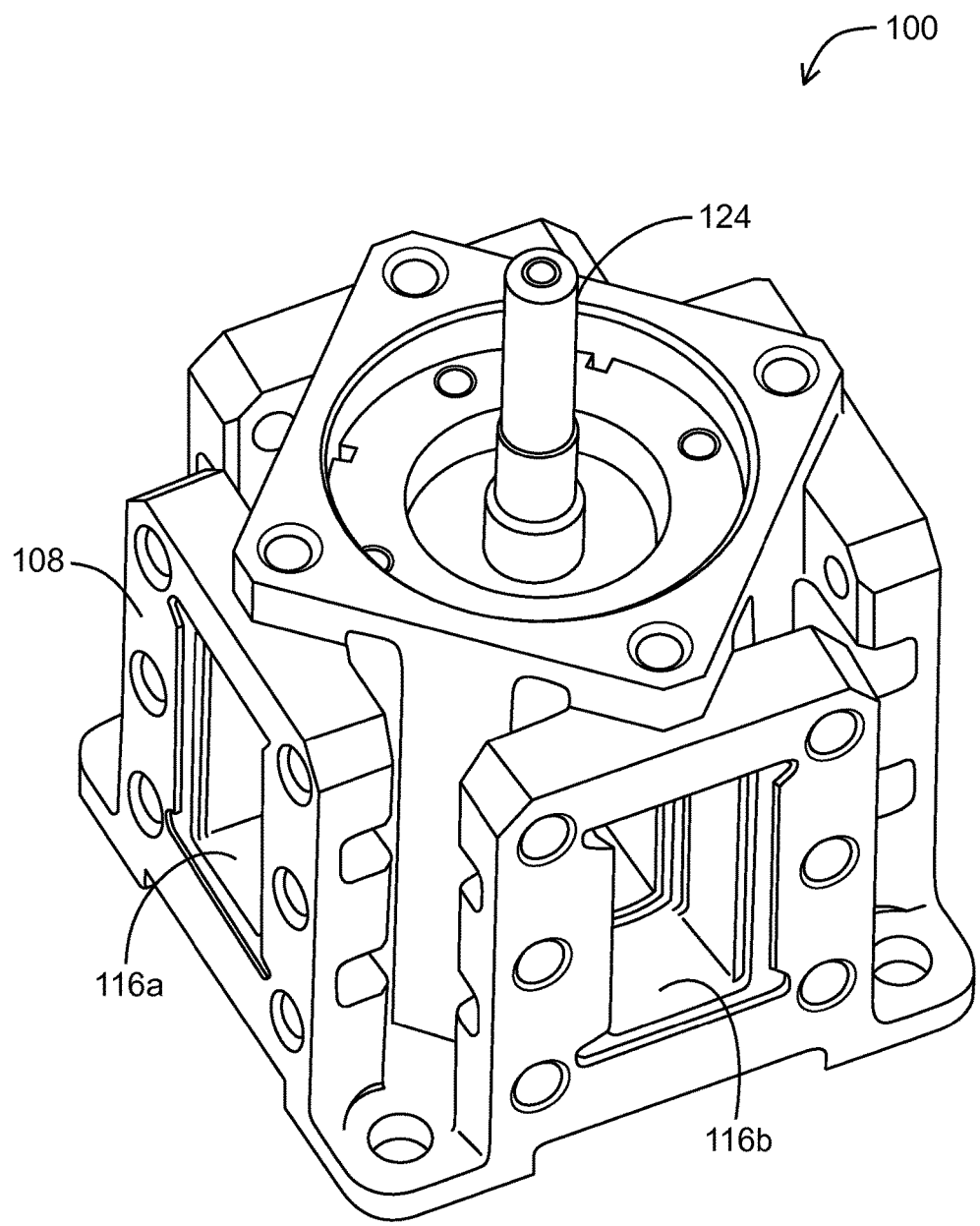
FIG. 1 illustrates a perspective view of an exemplary rotary radio frequency switch of the waveguide type known in the art.

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

"Magnetic element" herein refers to an element that produces a magnetic field and/or is attached or repelled when located within a magnetic field. A magnetic element may include a permanent magnet, a ferromagnetic element, or an electromagnet.

"Designated rotational direction" herein refers to the rotational direction (clockwise or counterclockwise) that a sequential actuator is designed to rotate in.

Referring now to FIG. 1, therein illustrated is a perspective view of a rotary radio frequency switch 100 of the waveguide type known in the art. The waveguide switch 100 includes a radio frequency housing 108 defining a plurality of ports. In the illustrated example, the waveguide switch 100 includes waveguide ports 116a, 116b, 116c, and 116d. Waveguide branches of one or more waveguide circuits may be connected to each of the waveguide ports 116a, 116b, 116c and 116d.

The waveguide switch 100 further includes a rotor 124 that is rotatable within the radio frequency housing 108. The rotor 124 has formed therein one or more waveguide sections operable to connect waveguide ports 116a, 116b, 116c and 116d. An actuator (not illustrated) rotates the rotor 124, thereby causing different to waveguide ports to be connected by the waveguide sections. The waveguide sections act as the actuated elements that are capable of conducting radio frequency signals.

Figure 2:
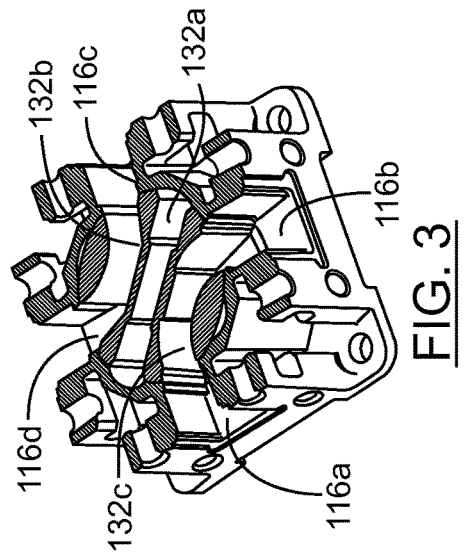
FIG. 2 illustrates a cutaway view of the exemplary waveguide switch with the rotor in a first angular position.

Referring now to FIG. 2, therein illustrated is a cutaway view of the waveguide switch 100 with the rotor 124 in a first angular position. It will be appreciated that a first straight waveguide section 132a of the rotor 124 connects fourth waveguide port 116d with an opposing waveguide port 116b.

Figure 3:
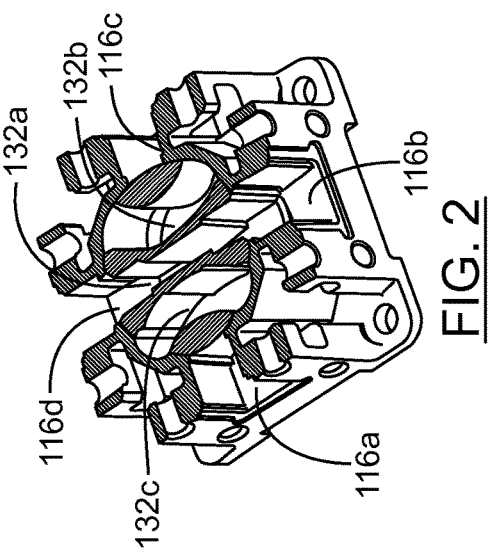
FIG. 3 illustrates a cutaway view of the exemplary waveguide switch with the rotor in a second angular position.

Referring now to FIG. 3, therein illustrated is a cutaway view of the waveguide switch 100 with the rotor 124 in a second angular position corresponding to a 45° rotation from the first angular position. It will be appreciated that a second curved waveguide section 132b of the rotor 124 connects fourth waveguide port 116d with third waveguide port 116c. Furthermore, third curved waveguide section 132c connects first waveguide port 116a with second waveguide 116b.

Figure 4:
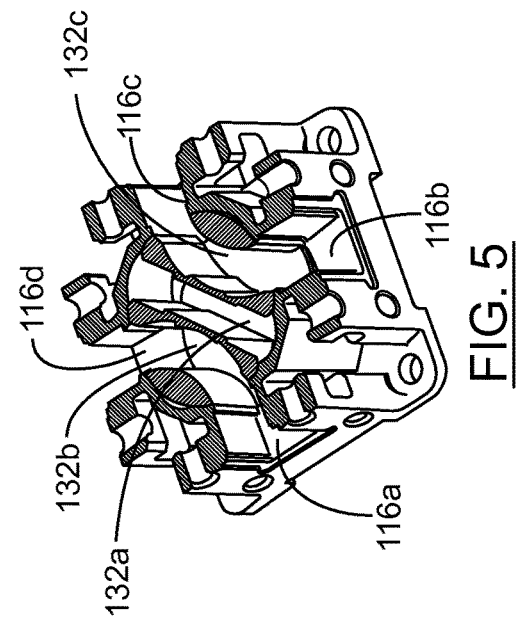
FIG. 4 illustrates a cutaway view of the exemplary waveguide switch with the rotor in a third angular position.

Referring now to FIG. 4, therein illustrated is a cutaway view of the waveguide switch 100 with the rotor 124 in a third angular position corresponding to a 90° rotation from the first angular position. It will be appreciated that the first straight waveguide section 132a now connects first waveguide port 116a with third waveguide port 116c.

Figure 5:
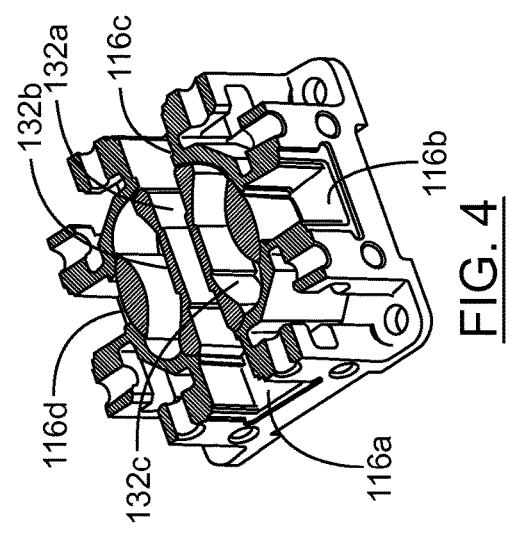
FIG. 5 illustrates a cutaway view of the exemplary waveguide switch with the rotor in a fourth angular position.

Referring now to FIG. 5, therein illustrated is a cutaway view of the waveguide switch 100 with the rotor 124 in a fourth angular position corresponding to a 135° rotation from the first angular position. It will be appreciated that in the fourth angular position, the second curved waveguide section 132b connects fourth waveguide port 116d with first waveguide port 116a. Furthermore, the third curved waveguide section 132c connects second waveguide port 116b with the third waveguide port 116c.

Figure 6:
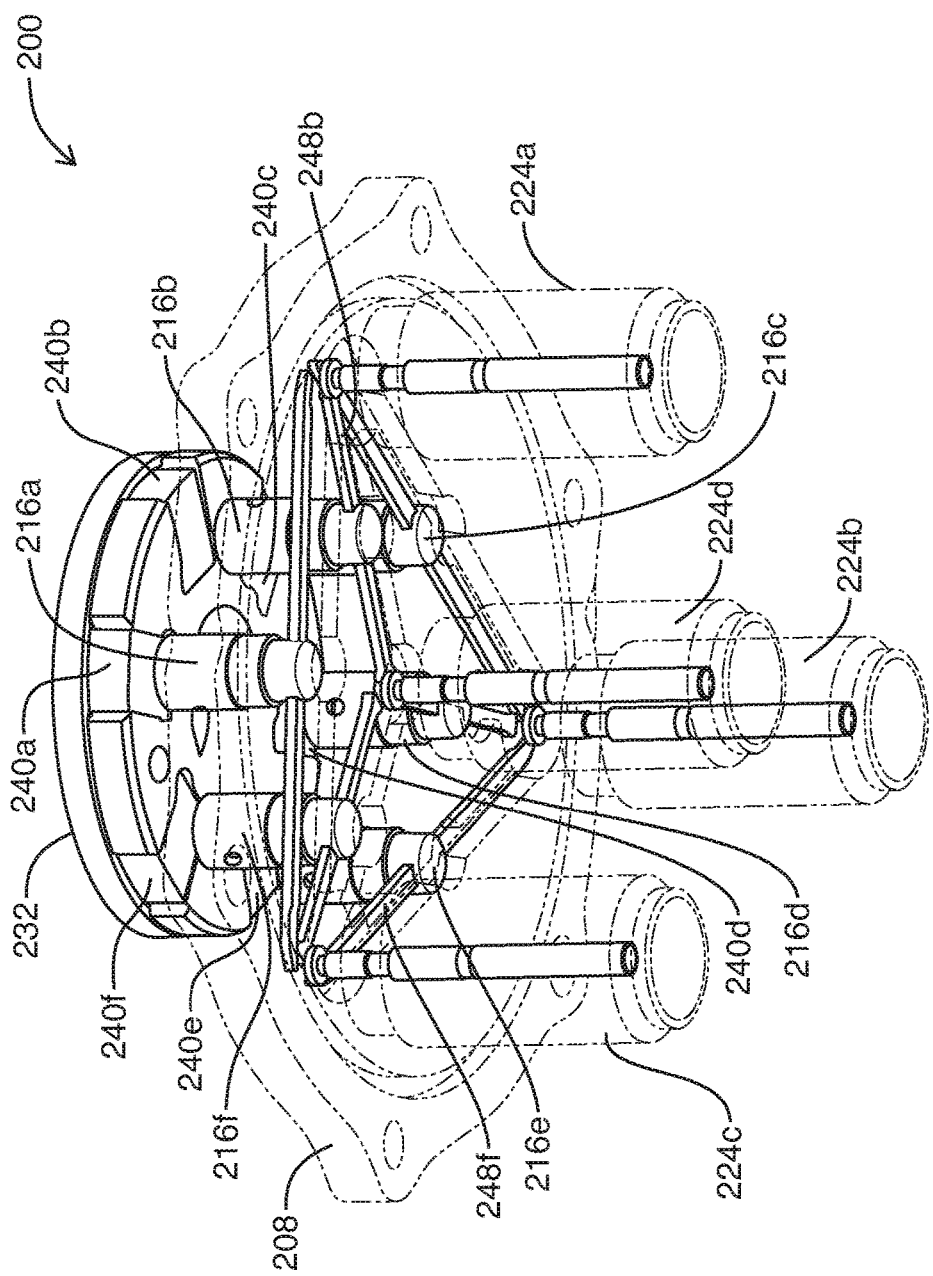
FIG. 6 illustrates a perspective view of an exemplary rotary radio frequency of the coaxial type known in the art.

Referring now to FIG. 6, therein illustrated is a perspective view of a rotary radio frequency switch 200 of the coaxial type known in the art. The coaxial switch 100 includes a housing 208 that houses a plurality of magnetic elements. In the illustrated example, the housing 208 has six magnetic elements 216a, 216b, 216c, 216d, 216e and 216f. The coaxial switch 100 further includes a plurality of coaxial ports. In the illustrated example, the coaxial switch 100 has four coaxial ports 224a, 224b, 224c, and 224d. Each of the magnetic elements is coupled to a conductive reed that connects two of the coaxial ports. The conductive reed acts as the actuated elements that are capable of conducting radio frequency signals. The coaxial switch 100 further includes a rotor 232 having a number of magnetic elements corresponding to the number magnetic elements of the housing 208. The magnetic elements of the rotor 232 are angularly spaced and the magnetic elements of the housing 208 are similarly angular spaced.

Accordingly, as the rotor 232 is rotated through various angular positions, the magnets elements of the rotor 232 are aligned with the magnetic elements of the housing 208. Some of the magnetic elements of the rotor 232 have a magnetic direction (ex: magnetic pole) that attracts the magnetic elements of the housing 208. The remainder of the magnetic elements of the rotor 232 having a magnetic direction (ex: magnetic pole) that repels the magnetic elements of the housing 208. In one configuration, a reed-carrying magnetic element of the housing 208 being repelled by the rotor 232 causes that reed-carrying magnetic element to be displaced to a position whereby the reed carried by that magnetic element connects its two coaxial connectors and a reed-carrying magnetic element of the housing 208 being attracted by the rotor 232 causes that reed-carrying magnetic element to be displaced to a position whereby the reed carried by that magnetic element is disconnected from its two coaxial connectors. In another configuration, a repelled reed-carrying magnetic element is disconnected from its two coaxial connectors while an attracted reed-carrying magnetic element is connected to its two coaxial connectors.

In the example illustrated in FIG. 6, the second rotor magnetic element 240b and fifth rotor magnetic element 240e are repelling magnets while the first, third, fourth and fifth magnetic elements 240a, 240c, 240d and 240f are attracting magnetic elements. The rotor 232 is in a position wherein a second reed-carrying magnetic element 216b and fifth reed-carrying magnetic element 216e are being repelled. The second reed 248b being carried by the second reed-carrying magnetic element 216b is displaced to engage and connect first coaxial connector 224a with fourth coaxial connector 224d. The fifth reed 248e being carried by the fifth reed-carrying magnetic element 216e is displaced to engage and connect third coaxial connector 224c with second coaxial connector 224b. First, third, fourth and sixth reeds 248a, 248c, 248d and 248f being attracted by rotor magnetic elements 240a, 240c, 240d and 240f are disconnected from any coaxial connectors. It will be appreciated that as the rotor 232 is rotated to another angular position, a different set of reed-carrying elements of the housing 208 is displaced to an engaging position to connect a different set of pairs of coaxial connectors.

Referring now to FIGS. 7 to 9, therein illustrated are plan views of an exemplary variable-reluctance stepper motor 300 known in the art. A variable reluctance (or pure reluctance) stepper motor 300 includes a plurality of phases, which may be formed by coils 308a, 308b, 308c, 308d, 308e, 308f arranged on pairs of stator poles 316a, 316b, 316c, 316d, 316e, and 316f. A ferromagnetic rotor 324 is driven by the reluctance torque that tends to align the ferromagnetic rotor 324 with regions of reduced reluctance, which corresponds to angular positions where the ferromagnetic rotor 324 is aligned with a stator pole that is energized (a current flowing through the coil arranged on that stator pole). The variable-reluctance stepper motor 300 may be used to actuate the radio frequency signal conductive elements described above.

FIGS. 7 to 9 show an exemplary three-phase 30° variable reluctance stepper motor. FIG. 7 illustrates the ferromagnetic rotor 324 in a first angular position when a first phase is energized (current flowing through coils 308a and 308d). De-energizing the first phase and energizing a second phase (current flowing through coils 308b and 308e) moves the rotor clockwise 30° to a second angular position, as illustrated in FIG. 8. De-energizing the second phase and energizing the third phase (current flowing through coils 308c and 308f) further rotates the rotor clockwise 30° to a third angular position. Since there are no permanent magnets, this type of actuator has no latching torque when the coils are de-energized.

Referring now to FIGS. 10 to 12, therein illustrated are plan views of an exemplary permanent magnet stepper motor 400 known in the art. The rotor 408 is a permanent magnet having a north pole 412 and a south 416. By selectively energizing phases of the stator 424 and ensuring appropriate polarities of the stator poles, the rotor 408 may be rotated to various angular positions. Unlike the variable reluctance stepper motor, the permanent-magnet rotor 408 provides a latching torque.

The illustrated permanent magnet stepper motor 400 is a three phase 60° permanent magnet stepper motor 400. FIG. 10 illustrates the permanent magnet rotor 408 in a first angular position when a first phase is energized (current following through coils 432a and 432b, thereby forming a magnetic north at stator pole 436a and magnetic south at stator pole 436d). De-energizing the first phase and energizing a second phase (current flowing throw coils 432b and 432e, thereby forming a magnetic north at stator pole 436b and magnetic south at stator pole 436e) moves the rotor clockwise 60° to a second angular position, as illustrated in FIG. 11. De-energizing the second phase and energizing the third phase (current flowing through coils 432c and 432f, thereby forming a magnetic north at stator pole 436c and a magnetic south at stator pole 436f) moves the rotor clockwise 60° to a third angular position, as illustrated in FIG. 12.

Figure 13A:
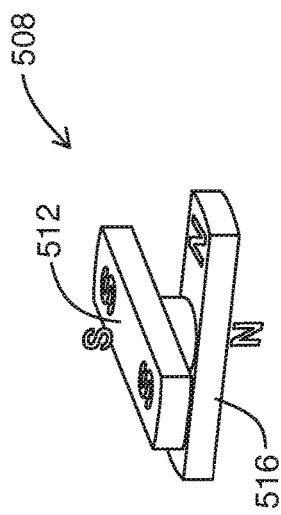
FIGS. 13 to 15 illustrate plan views of an exemplary hybrid stepper motor known in the art with the rotor in various angular positions.
Figure 15:
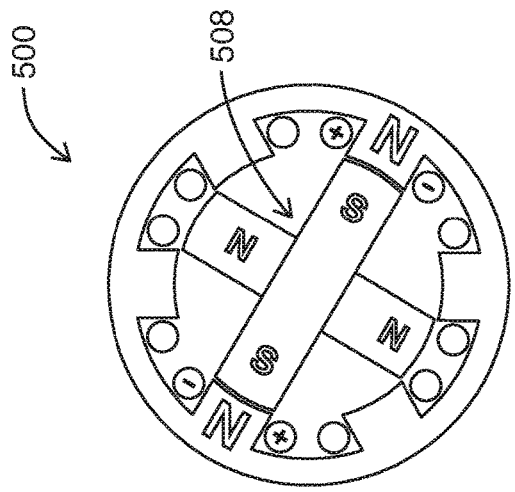
Figure 14:
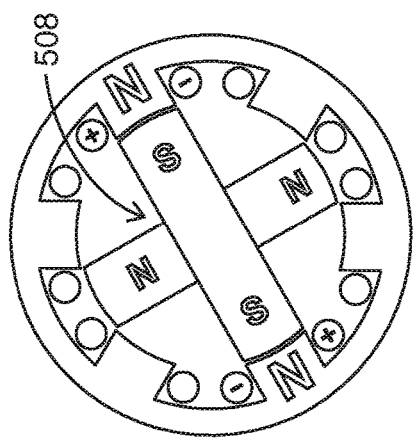
Figure 13B:
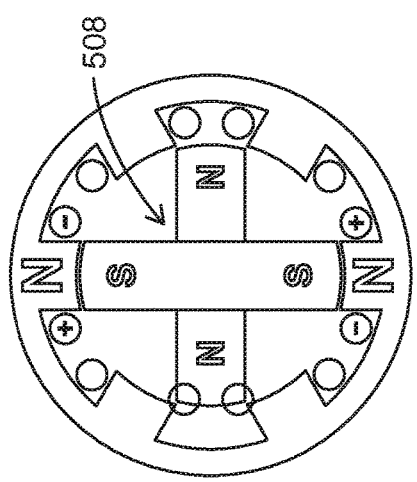

Referring now to FIG. 13a, therein illustrated is a perspective view of a rotor 508 of a hybrid stepper motor 500. The rotor 508 includes a first rotor 508 has a first rotor member 510 having a first set of poles and a second rotor 512 having a second set of poles. The poles of the first set have an opposite polarity to the poles of the second set. For example, and as illustrated, the first rotor member 510 is positioned at a first height above the second rotor member 512. The first set of poles is oriented to be out of phase with the second set of poles.

Referring now to FIGS. 13b to 15, therein illustrated are plan views of an exemplary hybrid stepper motor 500 known in the art. The hybrid stepper motor 500 combines properties of permanent magnet and variable reluctance designs. Selectively energizing the phases (flowing current through coils arranged on stator poles) causes the rotor 508 to be rotated to an angular position to be aligned with the currently energized phase. Furthermore, when the phase is de-energized, the rotor 508 has a latching torque.

In each of the variable reluctance stepper motor, the permanent magnet stepper motor and the hybrid stepper motor, multiple phases must be provided and selectively energized in order to cause rotation of the rotor between its defined angular positions. Actuators for switches using such motors are known as random actuators.

Referring now to FIG. 16 to 18, therein illustrated are plan views of an exemplary pure-reluctance sequential actuator 600. The pure-reluctance sequential actuator 600 includes a stator 604 that includes a plurality of stator poles 608. The stator poles 608 are positioned about an axis 632 to be equally spaced apart angularly. Each stator pole 608 has a coil 616 for energizing that stator pole 608.

The pure-reluctance sequential actuator 600 is configured to have a single phase. That is, the stator poles 608 cannot be selectively actuated. Instead a single energizing signal is used to energize the stator poles 608. Energizing the stator poles 608 refers to causing a current to flow through the coils 616, thereby creating a region of magnetic flux about each of the stator poles. Accordingly, all of the stator poles are energized simultaneously.

Referring now to FIG. 17, therein illustrated is a plan view of the pure-reluctance sequential actuator 600 having been energized. It will be appreciated that each of the stator poles 608 exhibits a magnetic pole having a north or a south orientation and creates a region of magnetic flux about each of the stator poles 608. For example, and as illustrated, the stator poles 608 alternate between having magnetic north and magnetic south.

The pure-reluctance sequential actuator 600 further includes a ferromagnetic rotor 624 positioned within the stator poles 608. The ferromagnetic rotor 624 is mounted so as to be adapted to rotate freely about an axis 632 of the pure-reluctance sequential actuator 600.

The ferromagnetic rotor 624 includes a plurality of protruding members 640 extending from a body 648 so that the protruding member 640 can be positioned closer to the stator poles 608 than surface portions 656 of the body 648. The protruding members 640 are positioned to be equally spaced apart angularly about the axis 632. For example, and as illustrated, the protruding members 640 extend radially towards the radially oriented stator poles 608. Accordingly, when the stator poles 608 are energized, they each create a magnetic field that is oriented radially.

In other examples, the protruding members 640 extend axially from the body 648 towards axially oriented stator poles 608. Accordingly, when the stator poles are energized, they each create a magnetic field that is oriented axially.

In yet other examples, the protruding members 640 may extend in a direction having both an axial and radial component towards similarly oriented stator poles 608. Accordingly, when the stator poles are energized, they each create a magnetic field that is oriented in a direction having the axial and radial component.

When the stator poles 608 are energized, a torque is applied on the rotor 624 towards an angular position of reduced reluctance (higher magnetic flux). Due to the protruding members 640 being positioned closer to the stator poles 608, the rotor 624 tends to rotate towards angular positions where the protruding members 640 are angularly aligned with the stator poles 608 because these angular positions corresponds to positions of reduced reluctance. These angular positions correspond to active stable zeros when the stator poles 608 are energized (the rotor 624 has a zero magnitude torque). Where the rotor 624 is positioned so that each protruding member is positioned exactly at a midpoint between two stator poles 608, the rotor 624 will be at an active unstable zero and may also not be rotated (although any slight shift in angular position will cause the rotor 624 to be rotated to its closest stable zero position).

Figure 19:
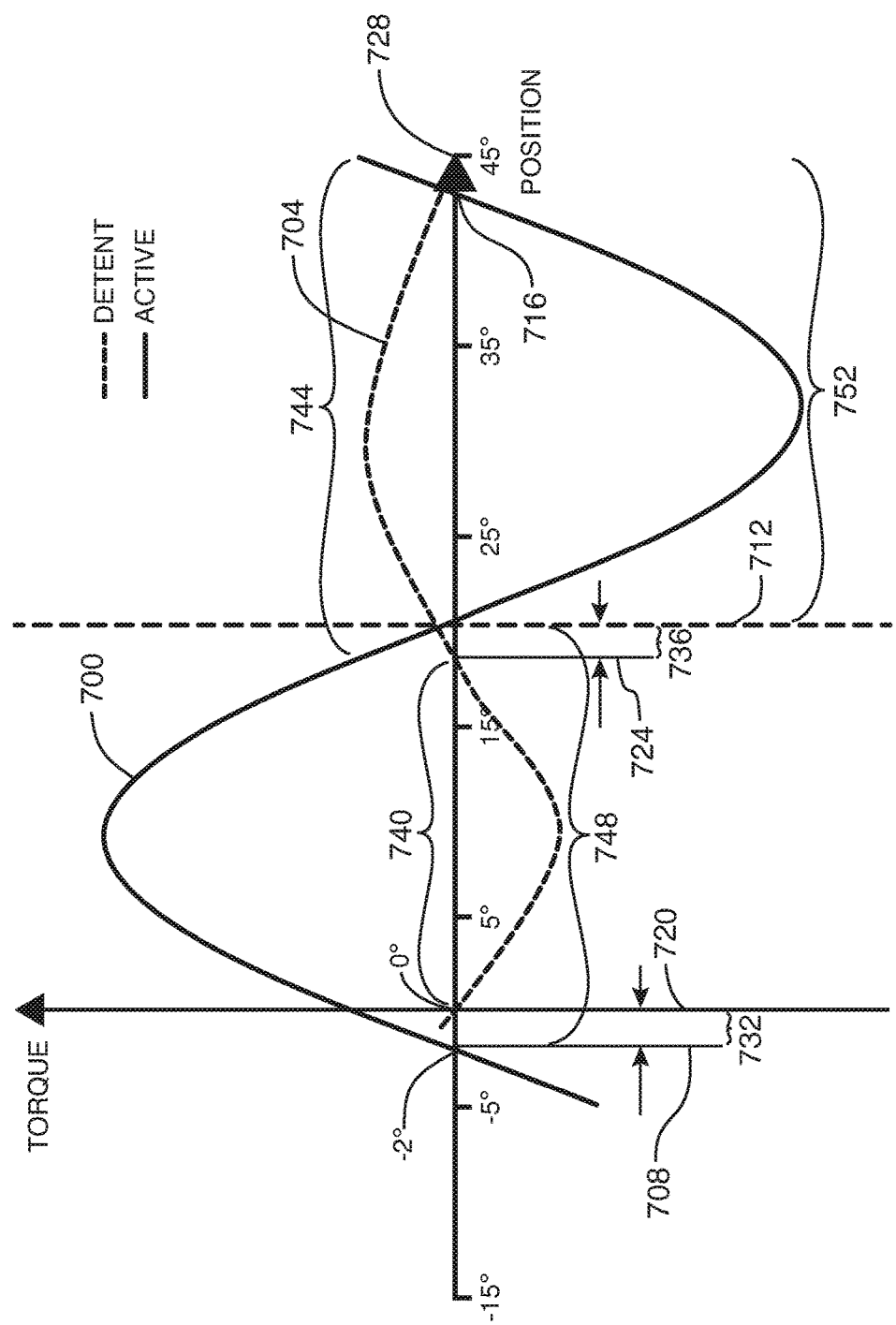
FIG. 19 illustrates a graph plotting the active torque curve and detent torque curve of the exemplary pure-reluctance sequential actuator.

The torque applied on the rotor 624 at any given angular position due to its tendency to rotate towards angular positions of reduced reluctance when the stator poles 608 are energized is herein referred to as the "active torque curve." Referring now to FIG. 19, therein illustrated is an active torque curve of the rotor 624 of the pure-reluctance actuator 600 illustrated in FIGS. 16 to 18. The angular position of the rotor 624 represents the angular position of a given reference indicator 664 with respect to a reference zero 672 in the designated rotational direction 680. It will be appreciated that due to the stator poles 608 being equally spaced apart angularly and the protruding members 640 of the rotor 624 being equally spaced apart angularly, the active torque curve of the rotor 624 is sinusoidal.

In the example illustrated FIG. 16 to 19, the sequential actuator 600 is configured to have 45° steps so that the rotor 624 can be rotated between 8 angular positions.

The pure-reluctance sequential actuator 600 further includes a plurality of magnetic elements distributed between the rotor 624 and the stator 604. At least one of the magnetic elements is placed on the rotor 624 and at least one of the magnetic element is placed on the stator 604. The magnetic elements are chosen to have magnetic fields strengths that are substantially below the magnetic fields strength of the magnetic fields created by the energized stator poles 608.

When the stator poles 608 are not energized, a torque is applied on the rotor 624 towards an angular position of reduced reluctance from the interaction of the magnetic elements distributed among the rotor 624 and the stator 604. The torque applied on the rotor 624 at any given angular position due to its tendency to rotate towards angular positions of reduced reluctance from the interaction of the magnetic elements when the stator poles 608 are de-energized is herein referred to as the "detent torque curve." These angular positions correspond to stable zeros when the stator poles 608 are de-energized, and are herein referred to as "detent stable zeros". The detent torque curve further includes a plurality of detent unstable zeros, wherein the rotor 624 also reaches a position where it has zero magnitude torque, but any slight shift in angular position will cause the rotor 624 to be rotated to its closest detent stable zero position.

The magnetic elements are positioned on the rotor 624 and the stator 604 based on the locations of the active stable zeros and the active unstable zeros of the active torque curve 700 defined by the rotor 624 and the stator 604.

More particularly, the magnetic elements are positioned so that a torque is applied on the rotor 624 due to the interaction of the magnetic elements. This torque causes the rotor 624 to be rotated in the designated rotational direction from each angular position corresponding to an active stable zero to an angular position corresponding to the next detent stable zero in the designated rotational direction. The next detent stable zero and that is past the angular position corresponding to the next active unstable zero in the designated rotational direction.

Further, the stator poles 608 are position so that a torque is applied on the rotor 624 due to the energizing of the stator poles 608. This torque causes the rotor 624 to be rotated in the designated rotational direction from each angular position corresponding to a detent stable zero to an angular position corresponding to the next active stable zero. The next active stable zero is past the angular position corresponding to the next detent unstable zero in the designated rotational direction.

Accordingly, when the rotor 624 is at an angular position corresponding to a given detent stable zero, upon energizing the stator poles 608, the rotor 624 is rotated in the designated rotational direction to the angular position corresponding to the next active stable zero, which is past the next detent unstable zero. Upon further de-energizing the stator poles 608, the rotor 624 is further rotated in the designated rotational direction due to the interaction of the magnetic elements to the angular position corresponding to the next detent stable zero. It will be appreciated that the result of the two previously described rotations causes a rotor 624 to be rotated from the angular position corresponding to the given detent stable zero to the next detent stable zero in the designated rotational direction. Further energizing the stator poles 608 followed by de-energizing of the stator poles causes the rotor 624 to be rotated to a further angular position corresponding to a further detent stable zero. Accordingly, through appropriate energizing and de-energizing of the stator poles 608, the rotor 624 can be sequentially rotated in the designated rotational direction between each of its active stable zeros and detent stable zeros.

The stator poles 608 may be energized by causing a current to flow through the coils surrounding the stator poles 608 for a limited duration of time sufficient to complete the rotation of the rotor to the angular position corresponding to the next active stable zero. For example, the stator poles 608 may be energized by a time-limited electrical pulse, such as a square pulse.

When the rotor 624 is in an angular position corresponding to the detent stable zeros, at least one of the signal conductive elements actuated by the rotor 624 is in a position to join a set of branches of one or more radio frequency circuits. By rotating the rotor 624 to another angular position corresponding to another detent stable zero, at least another one of the signal conductive elements actuated by the rotor 624 is in a position to join another set of branches of the one or more radio frequency circuits.

In other exemplary embodiments, when the rotor 624 is in an angular position corresponding to the active stable zeros, at least one of the signal conductive elements actuated by the rotor 624 is in a position to join a set of branches of one or more radio frequency circuits. By rotating the rotor 624 to another angular position corresponding to another active stable zero, at least another one of the signal conductive elements actuated by the rotor 624 is in a position to join another set of branches of one or more radio frequency circuits.

Referring back to FIG. 19, the plot illustrated therein further includes a detent torque curve 704 defined by the distribution of magnetic elements between the rotor 624 and stator 604 and satisfying the relative angular positions of active unstable zeros, active stable zeros, detent unstable zeros and detent stable zeros described above. The plot of FIG. 19 illustrates the active torque curve 700 and detent torque curve 704 over approximately a 45° step, which corresponds to approximately the angular range between two adjacent detent stable zeros. Within the approximately 45° step, the active torque curve 700 has a first active unstable zero 708, an active stable zero 712 and a second active unstable zero 716. Furthermore, within the approximately 45° step, the detent torque curve 704 has a first detent stable zero 720, a detent unstable zero 724, and a second detent stable zero 728.

It will be appreciated that the angular position of the first active unstable zero 708 and the passive stable zero 720 is offset, wherein the first active unstable zero 708 is at an angular position having a lesser value (ex: −2°) than an angular position of the first detent stable zero 720 (ex: 0°) along the designated rotational direction. The offset, which may be referred to as a lead angle 732, ensures that there is a non-zero active torque on the rotor 624 when the rotor 624 is at the angular position of the first detent stable zero 720 and the stator poles 608 are energized, thereby causing rotation of the rotor 624.

Similarly, it will be appreciated that the angular position of the active stable zero 712 and the detent unstable zero 724 is offset, wherein the active stable zero 712 is at an angular position (ex: 20.5°) having a greater value than an angular position (ex: 18°) of the detent unstable zero 724 along the designated rotational direction. The offset, which may be referred to as an overlap angle 736, ensures that there is a non-zero detent torque on the rotor 624 when the rotor 624 is at the angular position of the active stable zero 712 and the stator poles 608 are de-energized, thereby causing further rotation of the rotor 624.

It will be appreciated that a positive portion 744 and a negative portion 740 of the detent torque curve 704 are asymmetric. The positive portion 744 of the detent torque curve 704 is defined between the detent stable zero 724 and the second detent unstable zero 728. The negative portion 740 of the detent torque curve 704 is defined between the first detent stable zero 720 and the detent unstable zero 724. For example, the angular width of the negative portion 740 is narrower than the angular width of the positive portion 744. Accordingly, the detent torque curve 704 is non-sinusoidal. By contrast, a positive portion 748 and negative portion 752 of the active torque curve 700 are symmetric. The positive portion 748 and negative portion 752 may also be sinusoidal.

Since the locations of the detent stable zeros and detent unstable zeros are chosen based on the active torque curve 700, the detent torque curve 704 is herein referred to as being sculpted.

Referring now to FIGS. 20 to 22, therein illustrated is a schematic diagram of an exemplary distribution 800 of magnetic elements between the rotor 624 and stator 604. The distribution achieves the sculpted detent torque curve 704 illustrated in FIG. 19. A plurality of magnetic elements are placed on the rotor 624 at various angular positions about the axis 632. A plurality of magnetic elements are also placed on stator 604 at various angular positions about the axis 632.

At least one of the rotor 624 and stator 604 has unevenly distributed magnetic elements so as to define the sculpted detent torque curve 704. It will be understood that "unevenly distributed magnetic elements" may refer to the magnetic elements not being equally spaced apart angularly, the magnetic elements having different magnetic strengths, the magnetic elements being of different types (permanent magnets or ferromagnetic elements), or any combination of these situations.

For example, and as illustrated, four permanent magnets 808a, 808b, 808c, 808d are equally spaced apart angularly on the rotor 624 and six magnetic elements (4 permanent magnets 812a, 812b, 812c, 812d and two ferromagnetic elements 816a, 816b) are positioned on the stator 604. It will be appreciated that the detent torque applied on the rotor 624 at any given angular position will be due to the interaction of each of the magnetic elements of the rotor 624 with respect to the magnetic elements of the stator 604.

The placement of the magnetic elements may be determined in various ways. In one example, each pair of magnetic elements can be characterized individually (either experimentally or in simulation. A plurality of pairs of magnetic elements are then appropriately selected so as to provide the desired active torque curve.

Alternatively, a particular combination of magnetic elements may be parameterized in order to determine whether the desired active torque curve is produced. For example, the magnetic elements can be parameterized and optimized using numerical optimization.

Referring now to FIGS. 16 to 22 simultaneously, the rotor 624 is initially at an angular position of 0° corresponding to the position of the first detent stable zero 720 (FIGS. 16 and 20).

The stator poles 608 are subsequently energized and the torque applied on the rotor 624 is that of the active torque curve 700. The active torque at the 0° angular position is positive and non-zero. Accordingly, the rotor 624 is rotated to the angular position of the next active stable zero in the designated rotational direction, which is the active stable zero 712 at the 20.5° angular position (FIGS. 17 and 21). The active stable zero 712 is at an angular position having a greater angular value than an angular position of the detent unstable zero 724 with which it forms the overlap angle 736. The detent torque curve at this angular position is positive and non-zero.

The stator poles 608 are further de-energized and the torque applied on the rotor 624 is that of the detent torque curve 704. The detent torque curve at the 20.5° angular position is positive and non-zero. Accordingly, rotor 624 is further rotated to the next detent stable zero 728 at the 45° angular position (FIGS. 18 and 22), thereby reaching its next position for actuating signal conductive switching elements of the sequential actuator.

It has been observed that sculpting the detent torque curve through proper distribution and placement of the magnetic elements among the rotor 624 and stator 604 is effective for building an sequential actuator 600 with accurate actuation of the rotor 624. Moreover, since the pure-reluctance sequential actuator 600 has a single stator phase, the actuator 600 can have a reduced harness mass because only a single pole needs to be energized versus multiple poles for a multi-phase actuator. However, due to the need to include additional magnetic elements, the sequential actuator 600 having a sculpted detent torque curve may have increased weight.

Figure 23:
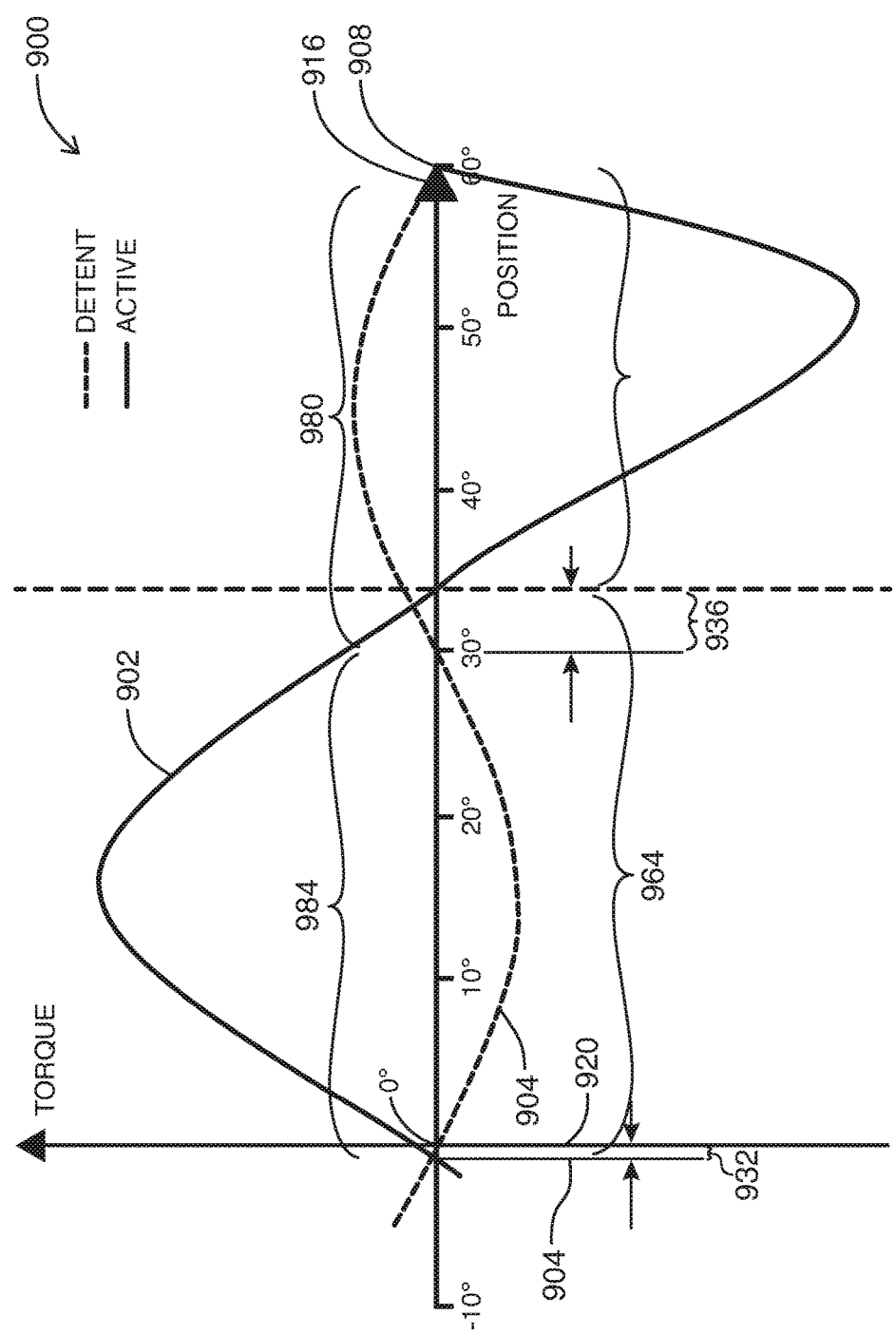
FIG. 23 illustrates a graph plotting the active torque curve and detent torque curve of an exemplary sequential actuator having a sculpted active torque curve.

Referring now to FIG. 23, therein illustrated is a graph showing active torque curve 902 and detent torque curve 904 in angular positions for a sequential actuator having a sculpted active torque curve according to various exemplary embodiments.

An "sculpted active torque curve" herein refers to a torque curve of the rotor 624 that is produced by a stator 604 and rotor 624 pair configured to provide active stable zeros and active unstable zeros based on the detent torque curve, such as the locations of the detent stable zeros and detent unstable zeros.

For example, and as illustrated, it will be appreciated that that the positive portion 980 of the detent torque curve 904 and negative portion 984 of the detent torque curve 904 are symmetric. For example, and as illustrated, the detent torque curve 904 is sinusoidal.

In the example illustrated in FIG. 23, the sequential actuator having a sculpted active torque curve is configured to have 60° steps so that the rotor can be rotated between 6 angular positions.

Referring now to FIGS. 24 to 26, therein illustrated is a schematic diagram of the distribution of magnetic elements between a rotor and a stator according to one exemplary embodiment of a sequential actuator having a sculpted active torque curve. The magnetic elements are distributed between the rotor and the stator whereby each of the rotor and the stator has at least one of the magnetic elements.

According to the illustrated example, one of the magnetic elements being a rotor magnetic element 948 is positioned on the rotor while the remaining magnetic elements are positioned equally spaced apart angularly about the axis of the sequential actuator having a sculpted active torque curve. The rotor magnetic element 948 may be a permanent magnet. The example illustrated in FIGS. 24 to 26 is for a six-pole actuator having steps of 60°. Accordingly, six magnetic elements 956a, 956b, 956c, 956d, 956e, 956f are positioned equally spaced apart angularly about the axis. The stator magnetic elements 956a, 956b, 956c, 956d, 956e, 956f may be permanent magnets.

In other examples the single magnetic element may be positioned on the stator while the remaining magnetic elements are positioned on the rotor. For example, this configuration may be useful where the magnetic elements on the rotor are also used for actuating signal conductive elements of the radio frequency switch.

The sequential actuator having a sculpted active torque curve further includes a rotor/stator pair defining a plurality of active stable zeros and active unstable zeros of the active torque curve of the rotor.

The stator and rotor pair of the sequential actuator having an sculpted active torque curve is configured based on the locations of the detent stable zeros and detent unstable zeros of the detent torque curve defined by the magnetic elements 948, 956a, 956b, 956c, 956d, 956e, 956f distributed among the rotor and the stator.

More particularly, the stator and rotor pair is configured so that a torque applied on the rotor due to the interaction of the magnetic elements distributed between the stator and rotor pair. This torque causes the rotor to be rotated in the designated rotational direction from each angular position corresponding to an active stable zero to an angular position that corresponds to the next detent stable zero in the designated rotational direction. The next detent stable zero is past the angular position corresponding to the next active unstable zero in the designated rotational direction.

Further, the stator and rotor pair is configured so that a torque is applied on the rotor due to the energizing of the stator poles. This torque causes the rotor to be rotated in the designated rotational direction from each angular position corresponding to a detent stable zero to an angular position corresponding to the next active stable zero in the designated rotational direction. The next active stable zero is past the angular position corresponding to the next detent unstable zero in the designated rotational direction.

Accordingly, when the rotor of the sequential actuator having an sculpted active torque is at an angular position corresponding to a given detent stable zero, upon energizing the stator poles, the rotor is rotated in the designated rotational direction to the angular position corresponding to the next active stable zero, which is past the next detent unstable zero. Upon further de-energizing the stator poles, the rotor is further rotated in the designated rotational direction due to the interaction of the magnetic elements to the angular position corresponding to the next detent stable zero.

It will be appreciated that the result of the two previously described rotations causes a rotor to be rotated from the angular position corresponding to the given detent stable zero to the next detent stable zero in the designated rotational direction. Further energizing the stator poles followed by de-energizing of the stator poles causes the rotor to be rotated to a further angular position corresponding to a further detent stable zero in the designated rotational direction. Accordingly, through appropriate energizing and de-energizing of the stator poles, the rotor can be sequentially rotated in the designated rotational direction between each of its active stable zeros and detent stable zeros.

The stator poles of the sequential actuator having a sculpted active torque may be energized by causing a current flow to through coils surrounding the stator poles for a limited duration of time sufficient to complete the rotation of the rotor to the angular position corresponding to the next active stable zero. For example, the stator poles may be energized by a time-limited electrical pulse, such as square pulse.

When the rotor is in an angular position corresponding to the detent stable zeros, at least one of the signal conductive elements actuated by the rotor is in a position to join at set of branches of one or more radio frequency circuits. By rotating the rotor to another angular position corresponding to another detent stable zero, at least another one of the signal conductive elements actuated by the rotor is in a position to join another set of branches of the one or more radio frequency circuits.

In other exemplary embodiments, when the rotor is in an angular position corresponding to the active stable zeros, at least one of the signal conductive elements actuated by the rotor is in a position to join a set of branches of one or more radio frequency circuits. By rotating the rotor to another angular position corresponding to another active stable zero, at least another one of the signal conductive elements actuated by the rotor is in a position to join another set of branches of one or more radio frequency circuits.

Referring back to FIG. 23, it will be appreciated that the active torque curve 902 formed by the stator and rotor pair satisfies the relative angular positions of active unstable zeros, active stable zeros, detent unstable zeros and detent stable zeros described above. The plot of FIG. 23 illustrates the active torque curve 902 and the detent torque curve 904 over approximately a 60° step, which corresponds to approximately the angular range between two adjacent detent stable zeros. Within the approximately 60° step, the active torque curve 902 has a first active unstable zero 908, an active stable zero 912 and a second active unstable zero 916. Furthermore, within the approximately 60° step, the detent torque curve 904 has a first detent stable zero 920, a detent unstable zero 924, and a second detent stable zero 928.

It will be further appreciated that the angular position of the first active unstable zero 908 and the detent stable zero 920 is offset, wherein the first active unstable zero 908 is at an angular position having a lesser value than an angular position of the detent stable zero 920 along the designated rotational direction, thereby forming a lead angle 932. This ensures that there is a non-zero active torque on rotor when the rotor is at the angular position of the first detent stable zero 920 and the stator poles are energized, thereby causing rotation of the rotor.

Similarly, it will be appreciated that the angular position of the active stable zero 912 and the detent unstable zero 924 is offset, wherein the active stable zero 912 is at an angular position having a greater value than an angular position of the detent unstable zero 924 along the designated rotational direction, thereby forming an overlap angle 936. This ensures that there is a non-zero detent torque on the rotor when the rotor is at the angular position of the active stable zero 912 and the stator poles are de-energized, thereby causing further rotation of the rotor.

It will be appreciated that a positive portion 964 and a negative portion 972 of the active torque curve are asymmetric. The positive portion 964 of the detent torque curve is defined between the active stable zero 912 and the second active unstable zero 916 in the designated rotational direction. The negative portion 972 of the active torque curve is defined between the active stable zero 912 and the second active unstable zero 916. For example, the angular width of the negative portion 972 is narrower than the angular width of the positive portion 964. Accordingly, the active torque curve is non-sinusoidal.

According to various exemplary embodiments wherein the detent torque curve 904 is symmetric, a positive portion 964 of the active torque curve 902 needs to have an angular width that is wider than a negative portion 972 of the detent torque curve 904 covering the approximately the same angular range so that a lead angle 932 and an overlap angle 936 may be provided by the positive portion 964 of the active torque curve 902. Accordingly, within an angular range defined between two adjacently positioned active unstable zeros (ex: active unstable zeros 908 and 916), the positive portion 964 of the active torque curve 902 within the range is wider than the negative portion 972 of the active torque curve 902 within the range. Adjacently positioned active unstable zeros refers to the two adjacently positioned active unstable zeros being each positioned at their respective angular position such that another active unstable zero is not positioned at an angular position between them.

The sequential actuator 940 having a sculpted active torque curve may be characterized by the number n of latched angular positions that the rotor can achieve. For example, the number of latched angular positions corresponds to the number of detent stable zeros over one rotation of the rotor. The angular distance between each pair of adjacently positioned latched angular position, corresponding to one step of the rotor, is approximately $$\frac{360°}{n}.$$

For example, FIG. 23 illustrates the active torque curve 902 and detent torque curve 904 for one 60° step of a sequential actuator having 6 latched angular positions of the rotor.

It will be appreciated that the positive portion 980 of the detent torque curve 904 and the negative portion 984 of the detent torque curve 904 each have an angular width equal to $$\frac{360°}{2n}.$$

In the example illustrated in FIG. 23, the positive portion 980 of the detent torque curve 904 and the negative portion 972 of the detent torque curve 904 each have an angular width of 30°. According to various exemplary embodiments, the negative portions 984 of each step of the rotor has an angular width substantially equal to $$\frac{360°}{2n}.$$

It will be further appreciated, due to the active torque curve 902 being sculpted to provide a lead angle 932 and overlap angle 936 in its positive portion 964 with the detent torque curve 904, at least one of the positive portions 964 of the active torque curve 902 has an angular width greater than $$\frac{360°}{2n}.$$

According to various exemplary embodiments, the positive portions 964 of each step of the rotor has an angular width greater than $$\frac{360°}{2n}.$$

Figure 27:
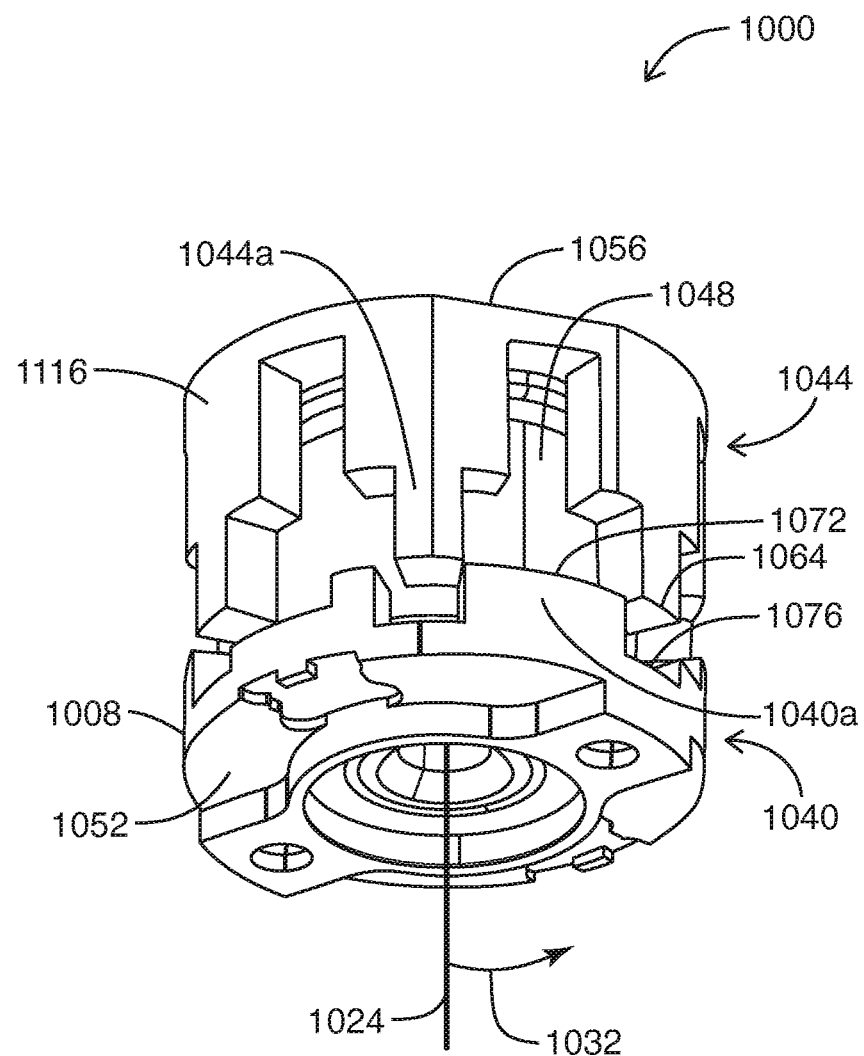
FIGS. 27 to 29 illustrates perspective views of the exemplary sequential actuator having the sculpted active torque curve with the rotor in various angular positions.

Referring now to FIG. 27, therein illustrated is a perspective view of a sequential actuator 1000 having a sculpted active torque curve according to one exemplary embodiment. The sequential actuator 1000 includes a rotor 1008 that is axially aligned with a stator 1016 about an axis 1024. The rotor 1008 is designed to be rotated in a designated rotational direction denoted by arrow 1032.

The rotor 1008 has a plurality of magnetic elements 1040 that are angularly positioned about the axis 1024. The stator 1116 also has a plurality of electromagnets 1044 angularly positioned about the axis 1024.

The sequential actuator 1000 further includes at least one coil 1048 for energizing the electromagnets 1044 of the stator 1116. For example, and as illustrated, a single coil may be provided for energizing the electromagnets 1044. In other examples, the electromagnets 1044 may each have a coil 1048. The at least one coil 1048 is configured to energize all of the electromagnets 1044 simultaneously. Accordingly, the sequential actuator 1000 is a single phase actuator.

It will be understood that various components for completing the sequential actuator 1000 are not shown in the example illustrated in FIG. 27, such as the magnetic elements distributed between the rotor and the stator that together define the detent torque curve (FIGS. 24 to 26).

Furthermore, rotor axle upon which the rotor 1008 rotates is not illustrated. Selectively actuated signal conductive elements, such as waveguide sections or conductive reeds, are also not illustrated.

According to the example illustrated in FIG. 27, magnetic elements 1040 of the rotor 1008 are ferromagnetic protruding members 1040 extending axially from a base 1052 of the rotor 1008. Each of the magnetic elements 1040 are positioned circumferentially at a given diameter from the axis 1024. Similarly, each of the electromagnets 1044 of the stator 1116 extend axially from a base 1056 of the stator 1116. Each of the electromagnets 1044 are also positioned circumferentially at the given diameter from the axis 1024. The coil 1048 is wound about the axis 1024 (i.e. within planes perpendicular to the axis 1024).

The extremities 1064 of the electromagnets 1044 are positioned at a height that substantially corresponds to extremities 1068 of the ferromagnetic protruding members 1040 of the rotor 1008. The surface 1076 of the portions of the rotor base 1052 that do not have a ferromagnetic protruding member is spaced apart from the extremities 1064 of the electromagnets 1044 of the stator 1116.

In other exemplary embodiments, the ferromagnetic protruding members 1040 of the rotor 1008 may extend radially (ex: outwardly) from the rotor base 1052 while the electromagnets 1044 of the stator 1116 also extend radially (ex: inwardly) from the stator body 1056. The height of the radially extending ferromagnetic protruding members 1040 may then overlap with the height of the electromagnets 1044 of the stator 1116.

At least one of the ferromagnetic protruding members 1040 and the electromagnets 1044 are unevenly arranged angularly about the axis 1024. For example, and as illustrated, the electromagnets 1044 are arranged evenly (i.e. the electromagnet 1044 are evenly spaced apart angularly and each of the electromagnet 1044 has the same angular width) while the ferromagnetic protruding members 1040 are arranged unevenly (i.e. the ferromagnetic protruding members 1040 are not evenly spaced and the members have different angular width). In some exemplary embodiments, both the ferromagnetic protruding members 1040 and the electromagnets 1044 may be unevenly arranged angularly.

The ferromagnetic protruding members 1040 or the electromagnets 1044 that is unevenly arranged angularly about the axis 1024 is arranged in such a manner the active torque curve of the rotor is sculpted as described herein. The sculpted active torque curve is achieved through the interaction of at least two pairs of ferromagnetic protruding members 1040 and electromagnet 1044 during one continuous rotation of the rotor 1008 between an angular position corresponding to one of its active unstable zero and an angular position corresponding to a subsequent active stable zero in the designated rotational direction when the electromagnets 1044 of the stator 1116 are energized.

Referring back to FIG. 27, the rotor 1008 is in an angular position corresponding to one of its detent stable zeros when the stator 1116 is de-energized. As the stator 1116 is energized, each of the electromagnets creates a region of magnetic flux having a directional component aligned with the axis 1024. Accordingly, the ferromagnetic rotor 1008 is driven by a reluctance torque that tends to align the ferromagnetic rotor 1008 with regions of reduced reluctance.

In the current angular position of the rotor 1008, a first ferromagnetic protruding member 1040a has a partial angular overlap with a first energized electromagnet 1044a. There is a partial angular overlap in that the ferromagnetic protruding member 1040a is partially located within the region of magnetic flux created by the first electromagnet 1044a but is not aligned within a region of maximum magnetic flux produced by that electromagnet 1044a. Accordingly, from the angular position illustrated in FIG. 27, the rotor 1008 is rotated in the designated rotational direction to an angular position of reduced reluctance.

Figure 28:
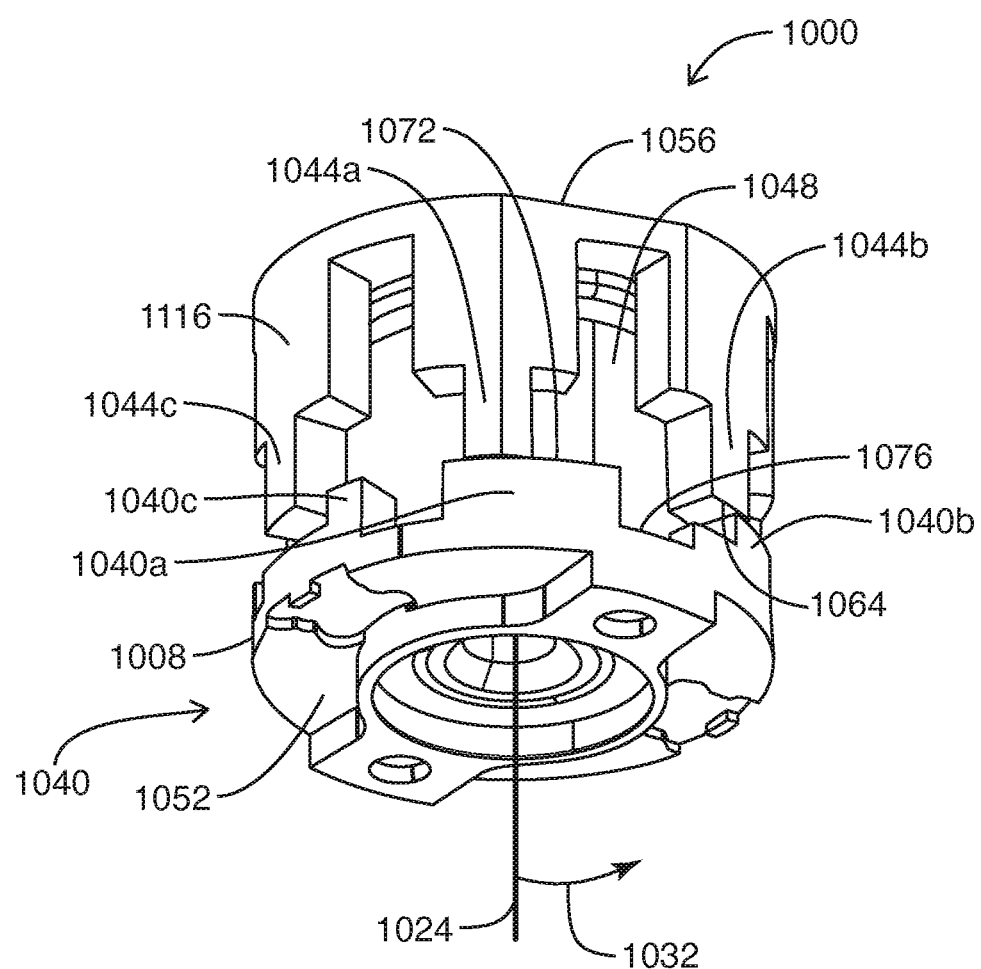

Referring now to FIG. 28, the rotor 1008 has been rotated to a first position of angular alignment of the first ferromagnetic protruding member 1040a with the first electromagnet 1044a. Angular alignment herein refers to the ferromagnetic protruding member 1040a being positioned within a region of maximum magnetic flux produced by the electromagnet 1044a.

In the first position of angular alignment, a second ferromagnetic protruding member 1040b has a partial angular overlap with a second energized electromagnet 1044b. Accordingly, from the first position of angular alignment illustrated in FIG. 28, the rotor 1008 undergoes a further (second) rotation in the designated rotational direction to a further angular position of reduced reluctance.

Figure 29:
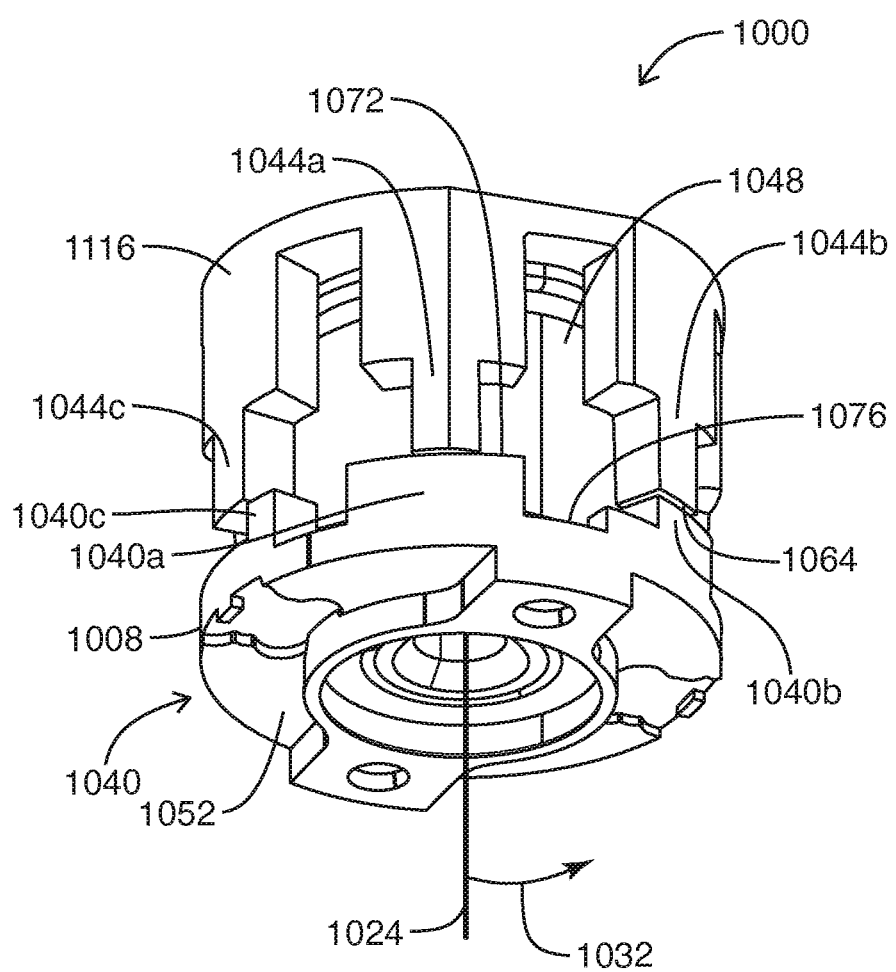

Referring now to FIG. 29, the rotor 1008 has been rotated to a second position of angular alignment. In the second position of angular alignment, the second ferromagnetic protruding member 1040b is located within a region of maximum magnetic flux produced by the second electromagnet 1044b. Furthermore, the first ferromagnetic protruding member 1040a maintains angular alignment with the second stator electromagnet 1044b.

The cumulative angular range covered by the first rotation of the rotor 1008 and the second rotation of the rotor 1008 corresponds to a portion of one continuous positive portion of the active torque. For example, the rotor 1008b may have reached a stable angular position corresponding to one of its active stable zeros. In such a case, cumulative angular range would correspond to the angular range between the angular position of the detent stable zero (FIG. 27) to its next active stable zero in the designated rotational direction.

According to other exemplary embodiments, the rotor 1008 may undergo a yet another rotation from its second position of angular alignment. For example, and as illustrated, when in the second position of angular alignment, a third electromagnetic protruding member 1040c has a partial angular overlap with a third energized electromagnet 1044c. Accordingly, from the second position of angular alignment illustrated in FIG. 29, the rotor 1008 undergoes a further (third) rotation in the designated rotational direction to a yet further angular position of reduce reluctance, which may be angular alignment of the third ferromagnetic protruding member 1040c of the rotor 1008 with the third stator electromagnet 1044c.

According to various exemplary embodiments, the ferromagnetic protruding members 1040 may have varying lengths of extension from the rotor base 1052. Varying the length of the extension of a ferromagnetic protruding member 1040 varies the distance between an extremity 1068 of that ferromagnetic protruding member with the extremities 1068 of the stator poles 1044. This may further vary the strength of the magnetic field felt by the ferromagnetic protruding member 1040 and the torque applied on the ferromagnetic rotor 1008.

For example, and as illustrated in FIGS. 27 to 29, second ferromagnetic protruding member 1040b has a first subportion 1080 having a lesser length of extension than a second subportion 1082.

According to various exemplary embodiments, for at least one of the angular steps of the rotor (i.e. from detent stable zero to next active stable zero), the rotation of the rotor is carried out according to the interaction of at least two pairs of ferromagnetic protruding members and electromagnets as described herein, for example, with reference to FIGS. 27 to 29. In some exemplary embodiments, each stepped rotation of the rotor is carried out according to the interaction of at least two pairs of ferromagnetic protruding members and electromagnets as described herein. The same ferromagnetic protruding member 1040 may be involved in multiples stepped rotations of the rotor 1008 (i.e., a given ferromagnetic protruding may be in angular alignment with one stator electromagnet 1044 during one stepped rotation of the rotor 1008 in one angular range and may be further in angular alignment with another stator electromagnet 1044 during another stepped rotation of the rotor 1008 in another angular range.

The mutual angular arrangement of the ferromagnetic protruding members 1040 and the electromagnets (whereby at least one of the ferromagnetic protruding members 1040 and the electromagnets 1044 are unevenly arranged angularly about the axis 1024) may be determined based on numerical optimization. In particular, the numerical optimization is carried out in order to achieve within one step of the rotor a positive portion 964 of the active torque curve 902 that has a lead angle 932 and overlap angle 936 with a corresponding negative portion 984 of the detent torque curve 904. The numerical optimization may be carried out so that for each step of the rotor a positive portion 964 of the active torque curve 902 that has a lead angle 932 and overlap angle 936 with a corresponding negative portion 984 of the detent torque curve 904.

For example, the numerical optimization can be carried out by parameterizing features of the sequential actuator, such as the regions of magnetic flux produced by the electromagnets, the angular width of each magnetic element 1040 of the rotor, the angular position of each magnetic element 1040, the length of the extension (whole portions or subportions) of each protruding member and the angular width of each magnetic element 1044 of the stator. The optimization is carried out so as to determine parameters that will produce the desired active torque curve, while avoiding undesirable results, such as negative torque. For example, cost functions may be assigned to various output parameters of arrangements considered within the numerical optimization. The cost functions may include whether a lead/overlap angle is created, the angular width of this angle, the torque margin. In other examples, some of the optimization may be carried out in ad hoc fashion by a designer.

The exemplary sequential actuator 1000 with sculpted active torque curve described with reference to FIGS. 23 to 29 has a detent torque curve that has symmetric negative and positive portions and an active torque curve that has asymmetric negative and positive portions. An advantage of this configuration is that the detent torque curve is simplified versus a sequential actuator having a sculpted detent torque curve. For example, the need for extra magnets and ferromagnetic elements required to sculpt the detent curve is eliminated.

According to other exemplary embodiments, the sequential actuator has both a sculpted active torque curve and a sculpted detent torque curve. The detent torque curve may be sculpted through appropriate distribution of magnetic elements between the rotor and the stator as described, for example, with reference to FIGS. 20 to 22 herein. Accordingly, the detent torque curve may be asymmetric, such as, being non-sinusoidal. The active torque curve may be sculpted through appropriate uneven angular arrangement of at least one of the ferromagnetic protruding members of and the electromagnets of the stator as described, for example, with reference to FIGS. 27 to 29. Accordingly, the active torque curve may also be asymmetric, such as, being non-sinusoidal.

An advantage of a sequential actuator having both a sculpted active torque curve and a sculpted detent torque curve is the possibility for achieving larger (i.e. more angularly wide) lead angles and/or overlap angles. Such larger lead angles and overlap angles may be useful to overcome high frictional forces within the actuator or to overcome hysteresis effects within the actuator.

Figure 30:
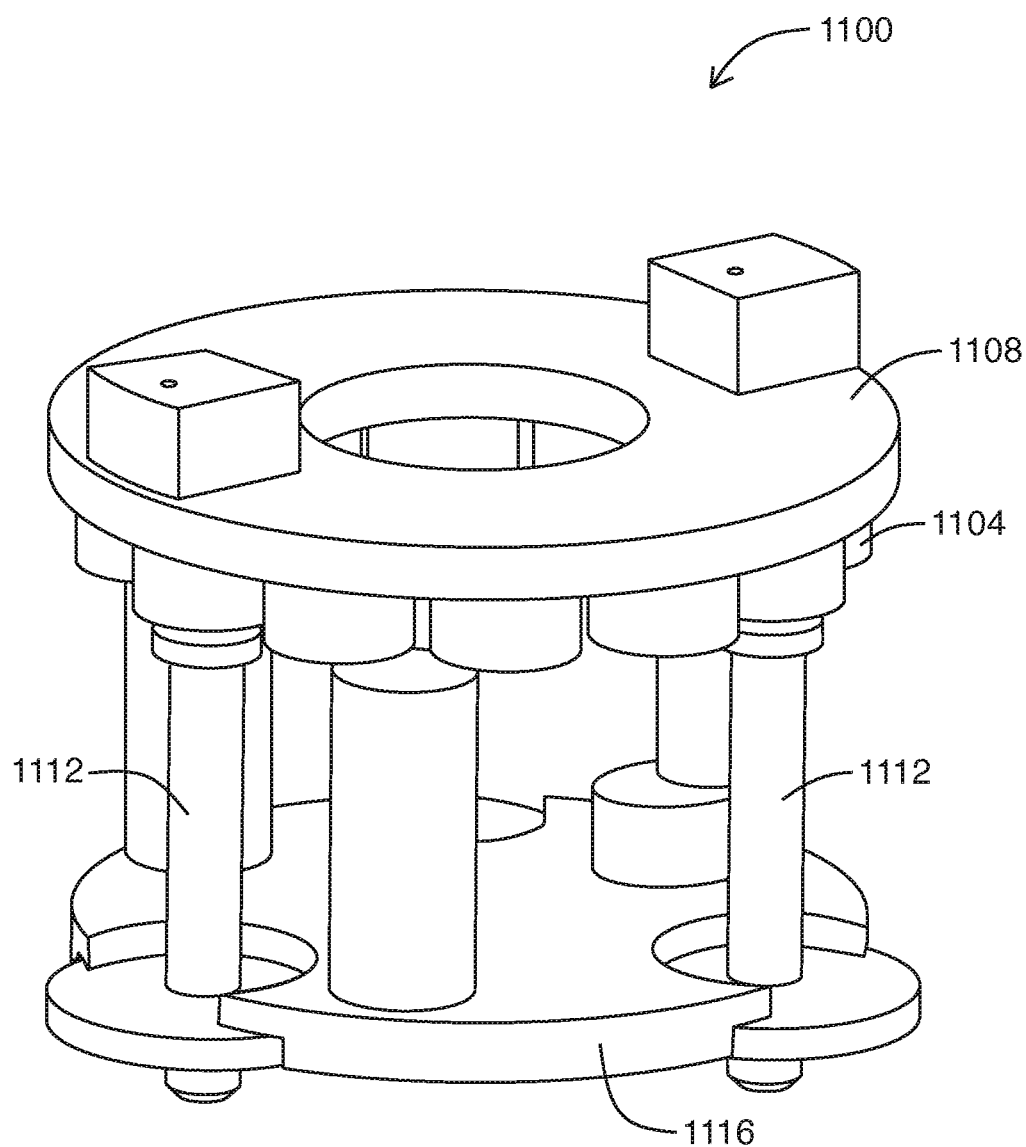
FIG. 30 illustrates a perspective view of an alternative exemplary sequential actuator having the sculpted active torque curve.

Referring now to FIG. 30, therein illustrated is a perspective view of a sequential actuator 1100 having a sculpted active torque curve according to an alternative exemplary embodiment. At least one of the set of magnetic elements of the stator and the set of magnetic elements of the rotor are permanent magnets. According to the example illustrated in FIG. 30, the permanents magnets 1104 are provided on the rotor 1108 of the sequential actuator 1100. It will be appreciated that these replace the ferromagnetic protruding members 1040 of FIGS. 27 to 29. The permanent magnets 1104 are oriented to be aligned with stator poles 1112 of a stator 1116. A coil (now shown) may be wound about the stator 1116 for energizing the stator poles 1112. It will be understood that the sequential actuator 1100 operates similarly to the sequential actuator 1000 described herein with reference to FIGS. 27 to 29. A first permanent magnet 1104 of the rotor 1108 is at an angular position of partial angular overlap with one of the stator poles 1112 when the stator poles 1112 are energized. This causes a first rotation of the rotor 1108 to a first position of angular alignment of the first permanent magnet 1104 with that stator pole 1112. Upon reaching the first angular position, a second permanent magnet 1104 is partial overlap with another stator pole 1112, which causes a further rotation of the rotor 1108 to a second position of angular alignment of the second permanent magnet with the other stator pole 1112.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A sequential actuator for a radio frequency switch, the actuator comprising:
   a rotor designed to be rotated in a designated rotational direction about an axis of the actuator in a stepped rotation between a plurality of latched angular positions that are substantially equally spaced apart angularly about the axis;
   a stator; and
   a plurality of magnetic elements distributed between the rotor and the stator, each of the rotor and the stator having at least one of the magnetic elements, the rotor including a plurality of protruding rotor magnetic elements angularly positioned about the axis and the stator including a plurality of protruding stator electromagnetic elements angularly positioned about the axis and at least one coil configured to energize all of the stator electromagnetic elements simultaneously, the distributed magnetic elements defining a detent torque curve of the rotor defined by the torque applied on the rotor due to the interaction of the magnetic elements distributed between the stator and the rotor when the stator electromagnetic elements are not energized, the detent torque curve including a plurality of detent stables zeroes wherein each detent stable zero defines one of the latched angular positions;

wherein at least one of the stator electromagnetic elements and the rotor magnetic elements are unevenly distributed angularly about the axis whereby when the stator electromagnetic elements are energized, the stator electromagnetic elements and the rotor magnetic elements define an active torque curve of the rotor having asymmetric positive and negative torque curve portions, wherein the active torque curve is defined to include a non-zero positive torque curve portion and a non-zero negative torque curve portion between each adjacent pair of latched angular positions, and the non-zero positive torque curve portion and the non-zero negative torque curve portion between each adjacent pair of latched angular positions are asymmetric, the active torque curve defined by the torque applied on the rotor at any given angular position through the interaction between the stator electromagnetic elements and the rotor magnetic elements when the stator electromagnetic elements are energized due to the tendency of the rotor to rotate towards angular positions of reduced reluctance;

wherein the stator electromagnetic elements and the rotor magnetic elements are distributed angularly about the axis to define the active torque curve to comprise angular positions of the rotor defining a plurality of active stable zeros and a plurality of active unstable zeros, the active stable zeros corresponding to angular positions where the rotor magnetic elements are angularly aligned with the stator electromagnetic elements, the active unstable zeros corresponding to angular positions where each rotor magnetic element is positioned at a midpoint between two stator electromagnetic elements;

wherein the stator electromagnetic elements and the rotor magnetic elements are unevenly distributed angularly about the axis whereby a positive portion of the active torque curve within an angular range defined between two adjacently positioned active unstable zeros has an angular with that is different from an angular width of a negative portion of the active torque curve within the angular range; and wherein the sequential actuator is a single phase actuator.

2. The sequential actuator of claim 1, wherein the stator when the stator electromagnetic elements are energized has n poles defined by angular positions of the stator electromagnetic elements, and wherein the stator electromagnetic elements and the rotor magnetic elements are unevenly distributed angularly about the axis whereby at least one of the positive portions of the active torque curve has an angular width greater than $$\frac{360°}{2n}.$$

3. The sequential actuator of claim 2, wherein each of the positive portions of the active torque curve has an angular width greater than $$\frac{360°}{2n}.$$

4. The sequential actuator of claim 2, wherein each of the negative portions of the detent torque curve has an angular width substantially equal to $$\frac{360°}{2n}.$$

5. The sequential actuator of claim 1, wherein the plurality of magnetic elements are angularly distributed to define the detent torque curve as a sinusoidal detent curve.

6. The sequential actuator of claim 1, wherein the plurality of magnetic elements comprises additional magnetic elements unevenly angularly distributed about the axis to define the detent torque curve as a non-sinusoidal detent curve.

7. The sequential actuator of claim 1, wherein the plurality of magnetic elements are angularly arranged about the axis such that a given positive portion of the active torque curve covers a given angular range defined between a given active unstable zero and an adjacent active stable zero in the designated rotational direction and a given negative portion of the detent torque curve corresponding to the given positive portion of the active torque curve is defined between a detent stable zero and an adjacent detent unstable zero in the designated rotational direction;

wherein the active unstable zero is at an angular position having a lesser value than an angular position of the detent stable zero along the designated rotational direction, thereby forming a lead angle;

wherein the active stable zero is at an angular position having a greater value than an angular position of the detent unstable zero, thereby forming an overlap angle;

wherein energizing the stator when the rotor is at the angular position of the detent stable zero rotates the rotor to an angular position of the active stable zero; and wherein de-energizing the stator when the rotor is at the angular position of the active stable zero further rotates the rotor to an angular position of the detent stable zero.

8. The sequential actuator of claim 1, wherein the plurality of rotor magnetic elements are arranged circumferentially at a given diameter from the axis of the actuator; and the plurality of stator electromagnetic elements are arranged circumferentially at the given diameter from the axis of the actuator;

wherein the plurality of rotor magnetic elements and the plurality of stator electromagnetic elements are angularly positioned about the axis to apply a torque on the rotor when the plurality of stator electromagnetic elements are energized whereby the rotor undergoes a first rotation in the designated rotational direction from an angular position of partial angular overlap of a first rotor magnetic element with a first stator electromagnetic element to a first angular position of angular alignment of the first rotor magnetic element with the first stator electromagnetic element along a first region of magnetic flux; and wherein upon reaching the first angular position, a second rotor magnetic element has a partial angular overlap with a second stator electromagnetic element and the rotor further undergoes a second rotation in the designated rotational direction to a second angular position of angular alignment of the second rotor magnetic element with the second stator electromagnetic element along a second region of magnetic flux.

9. The sequential actuator of claim 7, wherein the plurality of rotor magnetic elements are arranged circumferentially at a given diameter from the axis of the actuator;
   wherein the plurality of stator electromagnetic elements are arranged circumferentially at the given diameter from the axis of the actuator;
   wherein the plurality of magnetic elements are distributed angularly about the axis whereby when the stator electromagnetic elements are energized, the rotor undergoes a first rotation in the designated rotational direction from an angular position of partial angular overlap of a first rotor magnetic element with a first stator electromagnetic element to a first angular position of angular alignment of the first rotor magnetic element with the first stator electromagnetic element along a first region of magnetic flux;
   wherein upon reaching the first angular position, a second rotor magnetic element has a partial angular overlap with a second stator electromagnetic element and the rotor further undergoes a second rotation in the designated rotational direction to a second angular position of angular alignment of the second rotor magnetic element with the second stator electromagnetic element along a second region of magnetic flux; and
   wherein the angular position of partial angular overlap of the first rotor magnetic element corresponds to the angular position of the detent stable zero.

10. The sequential actuator of claim 8, wherein the protruding rotor magnetic elements are chosen from permanent magnets and ferromagnetic protruding members extending from a base of the rotor in the direction of protruding stator electromagnetic elements of the stator.

11. The sequential actuator of claim 8, wherein the angular positions of the plurality of rotor magnetic elements and the angular positions of the plurality of stator electromagnetic elements are determined based on numerical optimization.

12. A sequential actuator for a radio frequency switch, the actuator comprising:
   a rotor designed to be rotated in a designated rotational direction in a stepped rotation between a plurality of latched angular positions that are substantially equally spaced apart angularly about the axis, the rotor having a plurality of angularly arranged rotor magnetic elements;
   a stator having a plurality of angularly arranged stator electromagnetic elements and at least one coil configured to energize all of the electromagnetic elements simultaneously;
   wherein the plurality of rotor magnetic elements and stator electromagnetic elements are angularly distributed about an axis of the actuator whereby when the stator is energized, the rotor undergoes a first rotation in the designated rotational direction from an angular position of partial angular overlap of a first rotor magnetic element with a first stator electromagnetic element to a first angular position of angular alignment of the first rotor magnetic element with the first stator electromagnetic element along a first region of magnetic flux;
   wherein upon reaching the first angular position, a second rotor magnetic element has a partial angular overlap with a second stator electromagnetic element and the rotor further undergoes a second rotation in the designated rotational direction to a second angular position of angular alignment of the second rotor magnetic element with the second stator electromagnetic element along a second region of magnetic flux;
   wherein at least one of the stator electromagnetic elements and the rotor magnetic elements are unevenly distributed angularly about the axis whereby when the stator electromagnetic elements are energized, the stator electromagnetic elements and the rotor magnetic elements define an active torque curve of the rotor having asymmetric positive and negative torque curve portions, wherein the active torque curve is defined to include a non-zero positive torque curve portion and a non-zero negative torque curve portion between each adjacent pair of latched angular positions, the non-zero positive torque curve portion and the non-zero negative torque curve portion between each adjacent pair of latched angular positions are asymmetric and the non-zero positive torque curve portion has an angular width that is different from an angular width of the non-zero negative torque curve portion, the active torque curve defined by the torque applied on the rotor at any given angular position through the interaction between the stator electromagnetic elements and the rotor magnetic elements when the stator electromagnetic elements are energized due to the tendency of the rotor to rotate towards angular positions of reduced reluctance; and
   wherein the sequential actuator is a single phase actuator.

13. The sequential actuator of claim 12, wherein the rotor magnetic elements define with the stator electromagnetic elements an active torque curve of the rotor when the stator is energized, the active torque curve defined by the torque applied on the rotor at any given angular position through the interaction between the rotor magnetic elements the stator electromagnetic elements when the stator is energized due to the tendency of the rotor to rotate towards angular positions of reduced reluctance; and
   wherein the rotor magnetic elements and the stator electromagnetic elements are angularly arranged about the axis whereby the cumulative angular range of the first rotation and the second rotation corresponds to a portion of one continuous positive portion of the active torque curve of the rotor.

14. The sequential actuator of claim 12, wherein the rotor magnetic elements and the stator electromagnetic elements are angularly arranged about the axis whereby in the second position, a third rotor magnetic element has a partial angular overlap with a third stator electromagnetic element and the rotor further undergoes a third rotation in the designated rotational direction to a third position of angular alignment of the third rotor magnetic element with the third stator electromagnetic element along a third region of magnetic flux.

15. The sequential actuator of claim 12, wherein the rotor magnetic elements are ferromagnetic protruding members extending from a base of the rotor towards the stator electromagnetic elements.

16. The sequential actuator of claim 15, wherein the rotor magnetic elements have varying depth.

17. The sequential actuator of claim 12, wherein the rotor magnetic elements are permanent magnets.

18. The sequential actuator of claim 17, wherein the magnetic elements produce magnetic fields of varying magnetic strength.

19. The sequential actuator of claim 12, wherein the angular positions of the plurality of magnetic elements of the rotor and the angular positions of the plurality of electromagnets of the stator are determined based on numerical optimization.

20. A sequential actuator for a radio frequency switch, the actuator comprising:
- a rotor designed to be rotated in a designated rotational direction about an axis of the actuator;
- a stator; and
- a plurality of magnetic elements distributed between the rotor and the stator, each of the rotor and the stator having at least one of the magnetic elements, the rotor including a plurality of protruding rotor magnetic elements angularly positioned about the axis and the stator including a plurality of protruding stator electromagnetic elements angularly positioned about the axis and at least one coil configured to energize all of the stator electromagnetic elements simultaneously, the distributed magnetic elements defining a detent torque curve of the rotor defined by the torque applied on the rotor due to the interaction of the magnetic elements distributed between the stator and the rotor when the stator electromagnetic elements are not energized;
- wherein at least one of the stator electromagnetic elements and the rotor magnetic elements are unevenly distributed angularly about the axis whereby when the stator electromagnetic elements are energized, the stator electromagnetic elements and the rotor magnetic elements define an active torque curve of the rotor having asymmetric positive and negative torque curve portions, the active torque curve defined by the torque applied on the rotor at any given angular position through the interaction between the stator electromagnetic elements and the rotor magnetic elements when the stator electromagnetic elements are energized due to the tendency of the rotor to rotate towards angular positions of reduced reluctance;
- wherein at least one of the protruding rotor magnetic elements and the protruding stator electromagnetic elements have varying depth provided by the protruding members having a first subportion and a second subportion wherein the first subportion has a lesser length of extension than a second subportion.

* * * * *